United States Patent
Ohashi et al.

(10) Patent No.: US 9,798,908 B2
(45) Date of Patent: Oct. 24, 2017

(54) OBJECT DETECTION SYSTEM, OBJECT DETECTION METHOD, AND NON-TRANSITORY COMPUTER-READABLE MEDIUM STORING OBJECT DETECTION PROGRAM

(71) Applicant: NEC Corporation, Tokyo (JP)

(72) Inventors: Keishi Ohashi, Tokyo (JP); Wataru Hattori, Tokyo (JP); Naoki Kobayashi, Tokyo (JP); Hiroshi Fukuda, Tokyo (JP); Yusuke Takahashi, Tokyo (JP); Yusuke Konishi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/903,348

(22) PCT Filed: Jul. 7, 2014

(86) PCT No.: PCT/JP2014/003592
§ 371 (c)(1),
(2) Date: Jan. 7, 2016

(87) PCT Pub. No.: WO2015/004897
PCT Pub. Date: Jan. 15, 2015

(65) Prior Publication Data
US 2016/0148025 A1    May 26, 2016

(30) Foreign Application Priority Data
Jul. 10, 2013   (JP) ................................ 2013-144627

(51) Int. Cl.
*H04Q 5/22*    (2006.01)
*G06K 7/10*    (2006.01)
(Continued)

(52) U.S. Cl.
CPC ........... *G06K 7/10366* (2013.01); *G01B 7/02* (2013.01); *G01V 15/00* (2013.01); *G06K 7/10128* (2013.01); *G01V 3/12* (2013.01)

(58) Field of Classification Search
CPC .. G06K 7/10366; G06K 7/10128; G01B 7/02; G01V 15/00; G01V 3/12
See application file for complete search history.

(56) References Cited

U.S. PATENT DOCUMENTS

| 7,271,724 B2 | 9/2007 | Goyal et al. |
| 2004/0203478 A1 * | 10/2004 | Scott ................... G06K 7/0008 455/70 |

(Continued)

FOREIGN PATENT DOCUMENTS

| EP | 2 333 902 A1 | 6/2011 |
| JP | 2004-251816 A | 9/2004 |

(Continued)

OTHER PUBLICATIONS

International Search Report corresponding to PCT/JP2014/003592, dated Oct. 7, 2014 (5 pages).

(Continued)

*Primary Examiner* — Erin File
(74) *Attorney, Agent, or Firm* — Wilmer Cutler Pickering Hale and Dorr LLP

(57) ABSTRACT

An object detection system includes a reader waveguide (101) formed as an open transmission line, an RFID tag (102) placed above the reader waveguide (101), a signal strength acquisition unit (103) that acquires signal strength of a read signal read from the RFID tag (102) by electromagnetic coupling through the reader waveguide (101), and an object detection unit (104) that detects physical characteristics of an object (105) corresponding to the acquired signal strength based on a relationship between a plurality of (Continued)

(three or more values of) signal strength of the read signal and physical characteristics of the object to be detected.

19 Claims, 37 Drawing Sheets

(51) Int. Cl.
*G01B 7/02* (2006.01)
*G01V 15/00* (2006.01)
*G01V 3/12* (2006.01)

(56) References Cited

U.S. PATENT DOCUMENTS

| | | | |
|---|---|---|---|
| 2005/0099222 A1* | 5/2005 | Yang | H03C 3/40 327/404 |
| 2005/0150102 A1* | 7/2005 | Bosco | G06K 7/0095 29/593 |
| 2006/0086809 A1* | 4/2006 | Shanks | G06K 7/10178 235/492 |
| 2006/0093117 A1* | 5/2006 | Agrawal | H04M 3/42357 379/211.01 |
| 2006/0197676 A1* | 9/2006 | Smith | H04N 5/4403 340/10.1 |
| 2007/0024447 A1* | 2/2007 | Burnside | G06K 7/10316 340/572.1 |
| 2008/0055088 A1* | 3/2008 | Fabre | B65G 1/1371 340/572.1 |
| 2008/0129453 A1* | 6/2008 | Shanks | G06K 7/0008 340/10.1 |
| 2009/0085746 A1* | 4/2009 | Erickson | G06K 7/0008 340/572.1 |
| 2009/0121839 A1* | 5/2009 | Cornwell | G06K 7/10009 340/10.1 |
| 2009/0231097 A1* | 9/2009 | Brand | F16D 66/00 340/10.1 |
| 2011/0128125 A1 | 6/2011 | Kai et al. | |
| 2014/0267728 A1* | 9/2014 | Dahlin | H04N 7/188 348/148 |
| 2015/0161872 A1* | 6/2015 | Beaulieu | B66C 13/40 340/686.6 |
| 2016/0056542 A1* | 2/2016 | Faraone | H01Q 21/064 343/769 |
| 2016/0125211 A1* | 5/2016 | Hattori | G06Q 10/06 340/10.1 |

FOREIGN PATENT DOCUMENTS

| | | |
|---|---|---|
| JP | 2006-113316 A | 4/2006 |
| JP | 2008-164379 A | 7/2008 |
| JP | 2011-114633 A | 6/2011 |
| JP | 4828815 B2 | 9/2011 |

OTHER PUBLICATIONS

Hiromasa Chigusa et al., "Large Area Sensor Skin Based on Two-Dimensional Signal Transmission Technology," Proc. World Haptics, Mar. 2007, Tsukuba, Japan (6 pages).
Rahul Bhattacharyya et al., "Low Cost, Ubiquitous RFID Tag Antenna Based Sensing," Special Issue of IEEE Proceedings—RFID—A Unique Radio Innovation for the 21st Century, pp. 1-6, 2010.

* cited by examiner

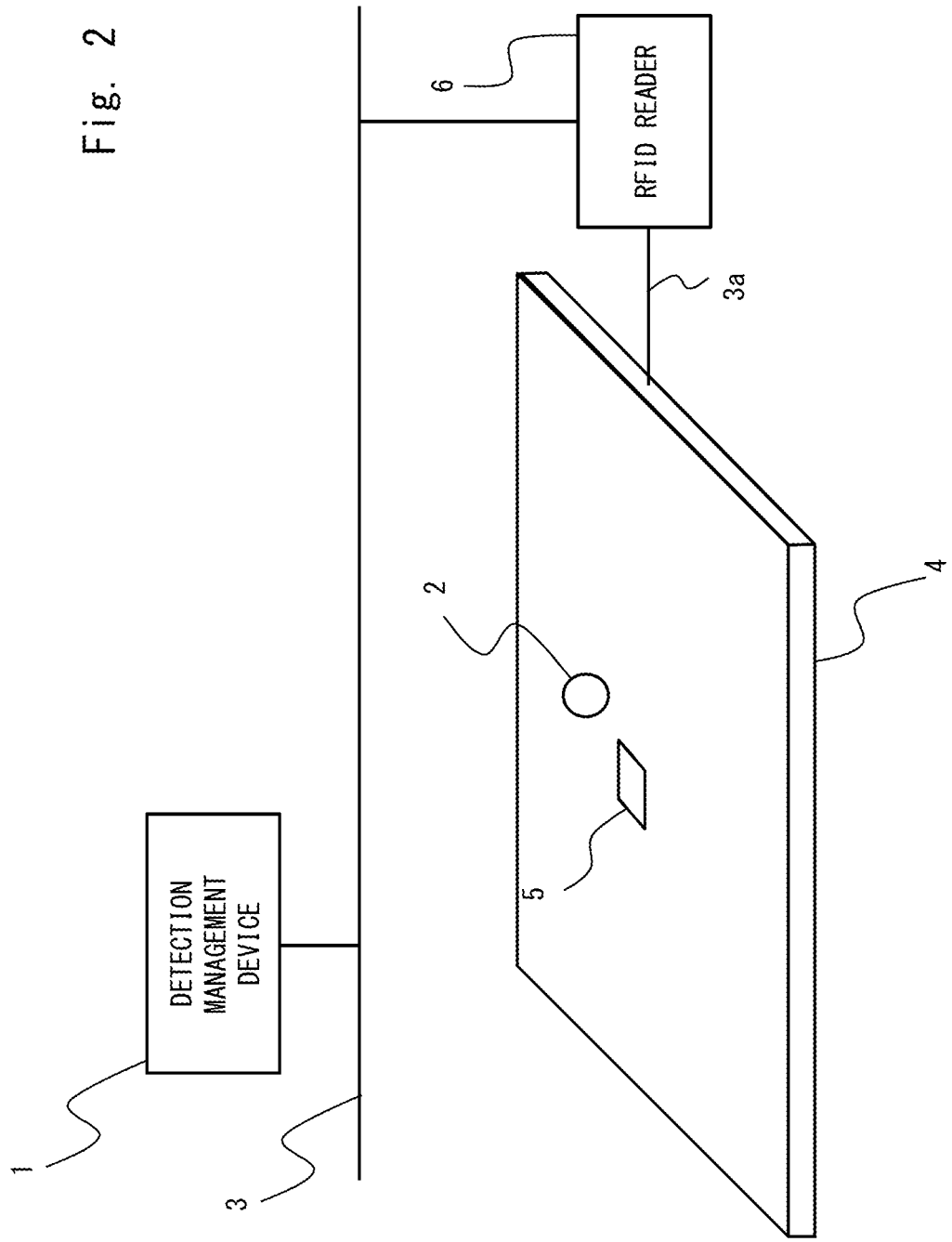

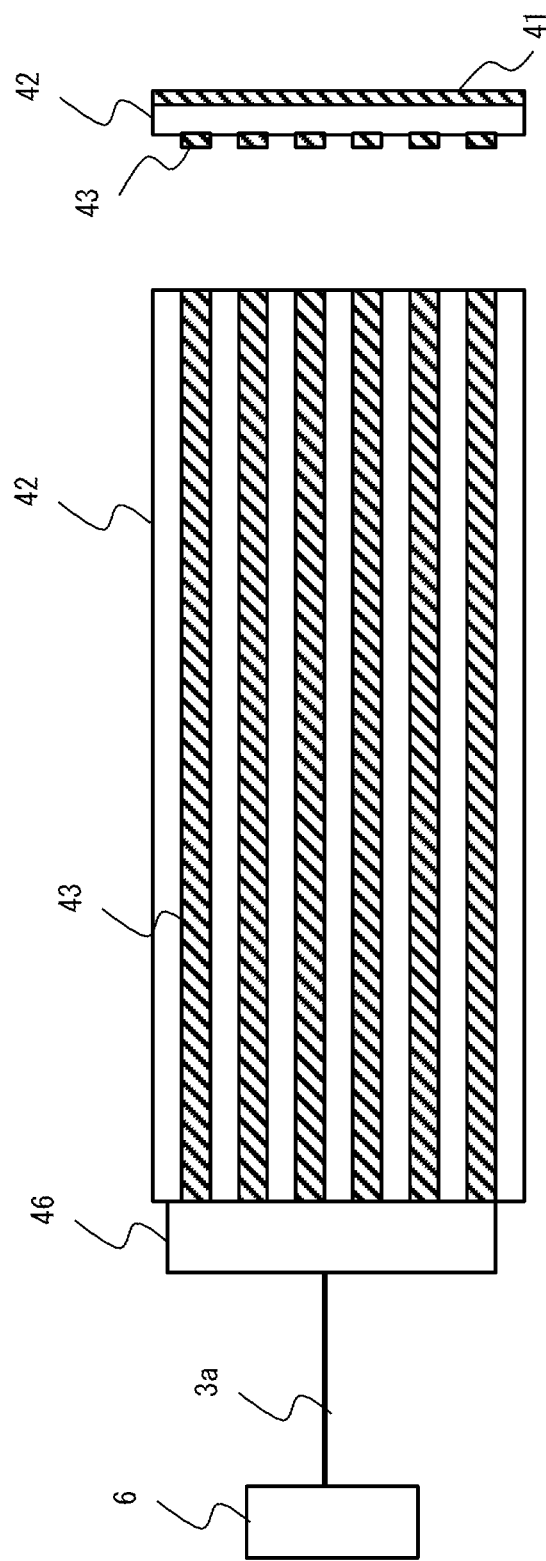

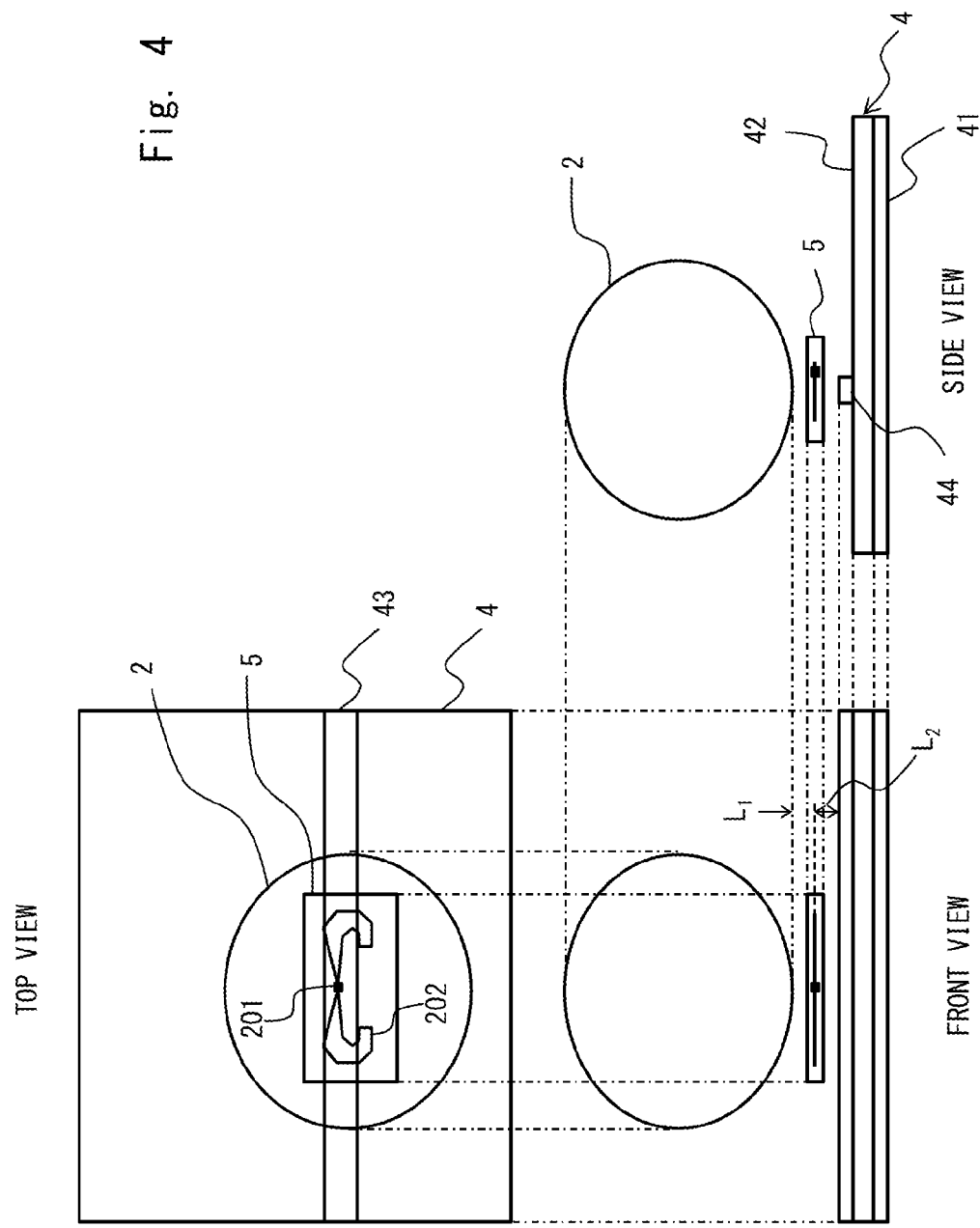

| DISTANCE Y | $1/4 \cdot (\lambda/2\pi)$ ≒0.04λ | $1/2 \cdot (\lambda/2\pi)$ ≒0.08λ | $\lambda/2\pi$ ≒0.16λ | $2 \cdot (\lambda/2\pi)$ ≒0.32λ | $\lambda$ | $2\lambda$ |
|---|---|---|---|---|---|---|
| AT 950MHz | 1.3cm | 2.5cm | 5.0cm | 10.1cm | 31.6cm | 63.2cm |
| QUASI-STATIC ELECTRIC FIELD (1/Y³) | 64 | 8 | 1 | 1/8≒0.13 | ≒0.004 | ≒5×10⁻⁴ |
| INDUCED ELECTRIC FIELD (1/Y²) | 16 | 4 | 1 | 1/4≒0.13 | ≒0.025 | ≒6×10⁻³ |
| RADIATED ELECTRIC FIELD (1/Y) | 4 | 2 | 1 | 1/2≒0.5 | ≒0.16 | ≒0.08 |

Fig. 6

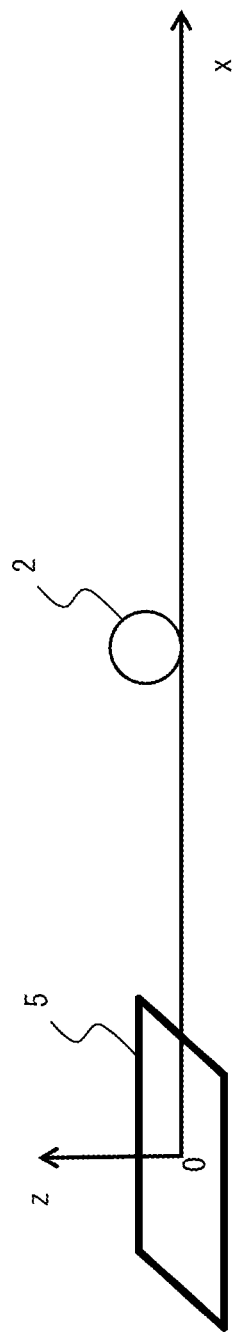

<CHARACTERISTIC PARAMETER INFORMATION 11a>

| | SHAPE 1 /SIZE 1 | SHAPE 1 /SIZE 2 | SHAPE 2 /SIZE 1 | SHAPE 2 /SIZE 2 |
|---|---|---|---|---|
| MATERIAL 1 | 0.1 | 0.5 | 0.3 | 0.8 |
| MATERIAL 2 | 1.5 | 1.9 | 1.7 | 2.5 |

<VERTICAL PARAMETER INFORMATION 11b>

|    | z1  | z2  | z3  | z4  |
|----|-----|-----|-----|-----|
| P2 | 1.0 | 0.8 | 0.3 | 0.1 |

<HORIZONTAL PARAMETER INFORMATION 11c>

|        | r1  | r2  | r3  | r4  |
|--------|-----|-----|-----|-----|
| $\phi1$ | 1.0 | 0.8 | 0.3 | 0.1 |
| $\phi2$ | 1.1 | 0.9 | 0.4 | 0.2 |

P3

OBJECT DETECTION SYSTEM, OBJECT DETECTION METHOD, AND NON-TRANSITORY COMPUTER-READABLE MEDIUM STORING OBJECT DETECTION PROGRAM

CROSS-REFERENCE TO RELATED APPLICATIONS

This application is a national stage application of International Application No. PCT/JP2014/003592 entitled "Object Detection System, Object Detection Method, and Non-Transitory Computer-Readable Medium Storing Object Detection Program," filed on Jul. 7, 2014, which claims priority to Japanese Patent Application No. 2013-144627, filed on Jul. 10, 2013, the disclosures of each which are hereby incorporated by reference in their entirety.

TECHNICAL FIELD

The present invention relates to an object detection system, an object detection method, and a non-transitory computer-readable medium storing an object detection program and, particularly, to an object detection system, an object detection method, and a non-transitory computer-readable medium storing an object detection program that detect an object using RFID tags.

BACKGROUND ART

Techniques to detect various objects using RFID tags are known. Related art is disclosed in Patent Literatures 1 and 2 and Non Patent Literatures 1 and 2, for example.

In Patent Literature 1, an RFID tag is placed at each of a plurality of article placement positions on a shelf, and an RFID reader reads a plurality of RFID tags to thereby detect the presence or absence of articles at the article placement positions. In Patent Literature 1, an article is placed between the RFID reader (antenna) and the RFID tag, and the article blocks the communication of signals, and thereby the presence or absence of the article is determined. Further, in Patent Literature 1, a limit (threshold) for determining the signal quality is set, and the presence or absence (I/O) of the article is detected by determining whether the signal is higher or lower than the threshold.

In Patent Literature 2, a plurality of RFID tags are on a plane facing a reader antenna, an envelope containing a metal piece is inserted between the reader antenna and the RFID tags, and the RFID reader reads the plurality of RFID tags to thereby detect the presence or absence or the position of the metal piece inside the envelope. In Patent Literature 2, like Patent Literature 1, the metal piece blocks the communication of signals, and thereby the presence or absence of the metal piece is determined, and the presence or absence (1/0) of the metal piece is detected by determining the success or failure of signal reading.

In Non Patent Literature 1, a tactile sensor where an RFID tag is attached to the side surface of a urethane grating and an antenna conductor is attached to the top and bottom surfaces of the urethane grating is used. Then, a plurality of tactile sensors are embedded in a knit-like artificial skin sheet, and the RFID reader reads the RFID tags to thereby detect the presence or absence or the position of contact with the artificial skin sheet. In Non Patent Literature 1, the presence or absence of contact is determined by pressing the tactile sensor from above and making a dent in the urethane, and thereby electrically connecting the antenna conductor and the RFID tag. Further, in Non Patent Literature 1, the presence or absence (I/O) of contact is detected by determining the presence or absence of a specified pressing force.

In Non Patent Literature 2, the RFID reader reads an RFID tag to thereby detect a temperature change according to a volume change in a dielectric layer near the RFID tag or a substance near the RFID tag, deformation of a beam near the RFID tag and the like.

CITATION LIST

Patent Literature

PTL1: U.S. Pat. No. 7,271,724
PTL2: Japanese Patent No. 4828815

Non Patent Literature

NPL1: Hiromasa Chigusa, Yasutoshi Makino, and Hiroyuki Shinoda, "Large Area Sensor Skin based on Two-Dimensional Signal Transmission Technology", Proc. World Haptics 2007, March, Tsukuba, Japan, pp. 151-156, 2007.
NPL2: Rahul Bhattacharyya, Christian Floerkemeier, Sanjay Sarma, "Low Cost, Ubiquitous RFID Tag Antenna Based Sensing", SPECIAL ISSUE OF IEEE PROCEEDINGS—RFID—A UNIQUE RADIO INNOVATION FOR THE 21ST CENTURY.

SUMMARY OF INVENTION

Technical Problem

Patent Literatures 1 and 2 and Non Patent Literature 1 use the success or failure of reading of an RFID tag and the like as criteria for detection, and there is a problem that only the presence or absence (I/O) of an object to be detected can be detected, and detection accuracy is low.

Further, Non Patent Literature 2 is based on the assumption that electromagnetic waves in a radiation field (far field) are used for detection, and there is a problem that desired detection accuracy (sensitivity) cannot be obtained in some environments of use.

In light of such problems, an exemplary object of the present invention is to provide an object detection system, an object detection method, and a non-transitory computer-readable medium storing an object detection program capable of improving the accuracy of detecting an object.

Solution to Problem

An object detection system according to an exemplary aspect of the present invention includes a reader waveguide formed as an open transmission line, an RFID tag placed above the reader waveguide, a signal strength acquisition unit that acquires signal strength of a read signal read from the RFID tag by electromagnetic coupling through the reader waveguide, and an object detection unit that detects physical characteristics of an object corresponding to the acquired signal strength based on a relationship between a plurality of (three or more values of) signal strength of the read signal and physical characteristics of the object to be detected.

An object detection method according to an exemplary aspect of the present invention includes acquiring signal strength of a read signal read from an RFID tag placed above a reader waveguide formed as an open transmission line by electromagnetic coupling through the reader waveguide, and detecting physical characteristics of an object corresponding to the acquired signal strength based on a relationship between a plurality of (three or more values of) signal strength of the read signal and physical characteristics of the object to be detected.

A non-transitory computer-readable medium storing an object detection program according to an exemplary aspect of the present invention causes a computer to execute an object detection process, the object detection process including acquiring signal strength of a read signal read from an RFID tag placed above a reader waveguide formed as an open transmission line by electromagnetic coupling through the reader waveguide, and detecting physical characteristics of an object corresponding to the acquired signal strength based on a relationship between a plurality of (three or more values of) signal strength of the read signal and physical characteristics of the object to be detected.

Advantageous Effects of Invention

According to the exemplary aspects of the present invention, it is possible to provide an object detection system, an object detection method, and a non-transitory computer-readable medium storing an object detection program capable of improving the accuracy of detecting an object.

BRIEF DESCRIPTION OF DRAWINGS

FIG. 2 is a schematic diagram showing the configuration of an object detection system according to a first exemplary embodiment;

FIG. 3A is a diagram showing an exemplary structure of a reader waveguide according to the first exemplary embodiment;

FIG. 4 is a three-view drawing showing an enlarged view of vicinity of an RFID tag according to the first exemplary embodiment;

FIG. 6 is a table showing a relationship between a distance and an electric field of an RFID tag according to the first exemplary embodiment;

FIG. 7A is a diagram illustrating a relationship between a horizontal distance of an object and a variation in signal strength according to the first exemplary embodiment;

FIG. 11 is a view showing an example of data stored in the detection management device according to the first exemplary embodiment;

DESCRIPTION OF EMBODIMENTS

Characteristics of Exemplary Embodiment

Figure 1:
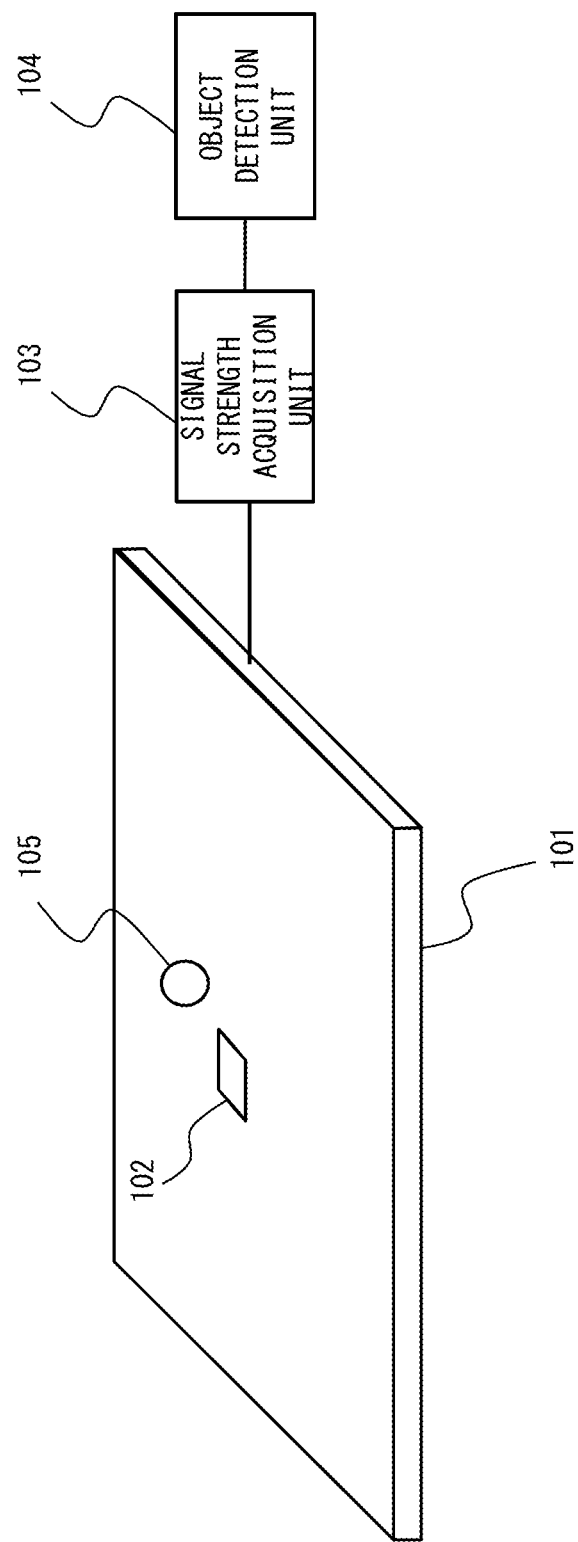
FIG. 1 is a schematic diagram illustrating the main characteristics of an object detection system according to an exemplary embodiment.

Prior to describing exemplary embodiments, the overview of the characteristics of exemplary embodiments is described hereinbelow. FIG. 1 shows main elements of an object detection system according to an exemplary embodiment.

As shown in FIG. 1, the object detection system according to this exemplary embodiment includes a reader waveguide 101, an RFID tag 102, a signal strength acquisition unit 103, and an object detection unit 104.

The reader waveguide 101 is formed as an open transmission line. The RFID tag 102 is placed above the reader waveguide 101. The term "above" means the opposite side of the RFID tag 102 from the reader waveguide 101, and when it is placed on a wall surface perpendicular to the ground, for example, the "above" is the direction away from the wall surface. The signal strength acquisition unit 103 acquires the signal strength of a read signal read from the RFID tag 102 by electromagnetic coupling through the reader waveguide 101.

The object detection unit 104 detects physical characteristics of an object 105 corresponding to the signal strength acquired by the signal strength acquisition unit 103 based on the relationship between a plurality of (three or more values of) signal strength of a read signal read from the RFID tag 102 and the physical characteristics of the object 105 to be detected.

In the related art, because the success or failure of reading of an RFID tag and the like are used as criteria for detection, only the presence or absence of an object to be detected can be detected, and as a result, even if a plurality of RFID tags are used, information about the position of a detected object cannot be obtained at the accuracy higher than the interval of the tags. On the other hand, because the physical characteristics of an object are determined based on multivalued (three or more values of) signal strength of a read signal read from an RFID tag in this exemplary embodiment, the physical characteristics of the object can be detected in more detail than the related art, and it is thus possible to improve the detection accuracy.

Further, because the related art is based on the assumption that electromagnetic waves in a radiation field (far field) are used for detection, the accuracy of detection is low in some cases. On the other hand, because the configuration that reads an RFID tag placed above the reader waveguide by electromagnetic coupling through the reader waveguide formed as an open transmission line is employed in this exemplary embodiment, the RFID tag is read using electromagnetic waves in a near field, and it is thus possible to achieve the higher detection accuracy than the related art.

First Exemplary Embodiment

A first exemplary embodiment is described hereinafter with reference to the drawings. FIG. 2 shows an example of the configuration of an object detection system according to this exemplary embodiment. The object detection system is a system that detects an object using an RFID tag. An object to be detected may be any object that can be detected by a detection method according to this exemplary embodiment, which is described later, including various articles, living things and human bodies.

As shown in FIG. 2, the object detection system according to this exemplary embodiment includes a detection management device 1, an RFID reader 6, a reader waveguide 4, and an RFID tag 5. The object detection system may include a plurality of RFID tags 5, or may include a plurality of reader waveguides 4 as described later.

The RFID reader 6 and the detection management device 1 are connected to be able to transmit and receive data through a communication network 3 such as LAN. The RFID reader 6 and the reader waveguide 4 are connected through a LAN cable (high-frequency cable) 3a.

Figure 3B:
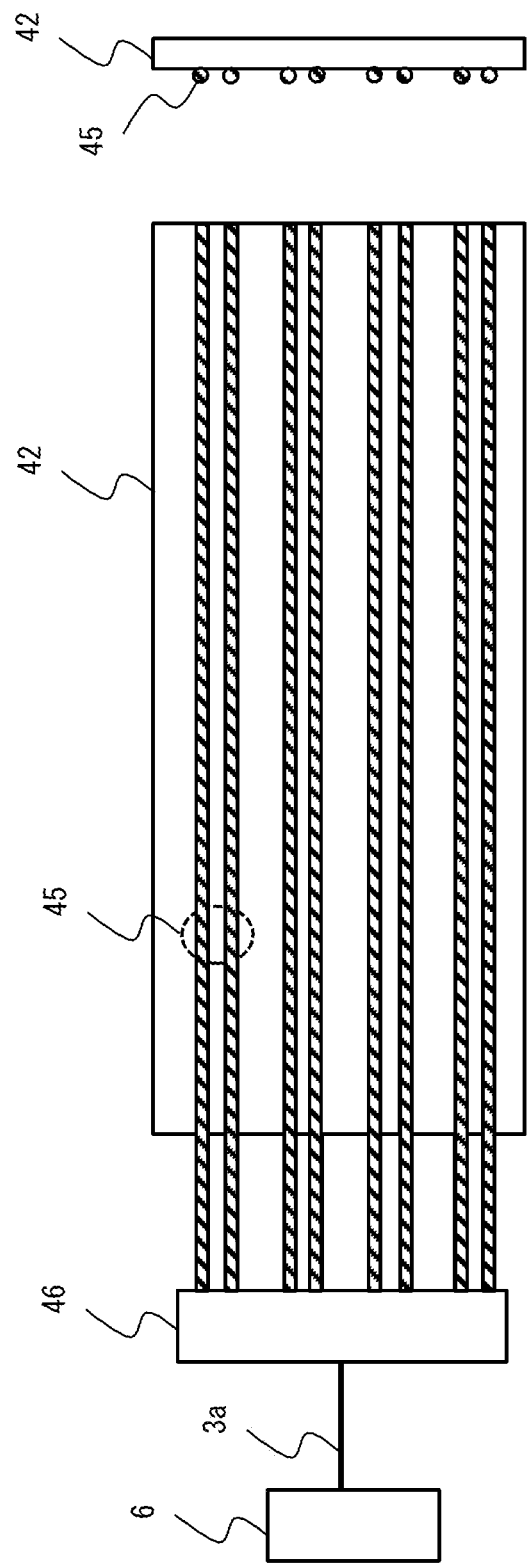
FIG. 3B is a diagram showing an exemplary structure of the reader waveguide according to the first exemplary embodiment.

The reader waveguide 4 is formed as an open transmission line terminated with matching impedance, and it is an open waveguide having a structure in which electromagnetic waves come out to the area surrounding the waveguide as a near-field, such as a microstrip structure, a coplanar line, or a slot line. FIG. 3A shows an example where the reader waveguide 4 is formed as microstrip lines, and FIG. 3B shows an example where the reader waveguide 4 is formed as parallel lines.

In the example of FIG. 3A, the RFID reader 6 and a distributor 46 are connected through a high-frequency cable 3a, and the distributor 46 distributes signals of the high-frequency cable 3a to a plurality of strip conductors (microstrip lines) 43. A plurality of strip conductors 43 lie in parallel on a spacer 42, which is a dielectric layer, and a ground plane 41 is formed over the whole area below the spacer 42.

In the example of FIG. 3B, the RFID reader 6 and a distributor 46 are connected through a high-frequency cable 3a, and the distributor 46 distributes signals of the high-frequency cable 3a to a plurality of parallel lines 45. A plurality of parallel lines 45 lie in parallel on a spacer 42, which is a dielectric layer. Note that, the distributor 46 may have a function such as impedance conversion or balance-unbalance conversion.

As shown in FIG. 2, the RFID tag 5 is fixedly placed in advance on the reader waveguide 4. The vicinity of the RFID tag 5 above the reader waveguide 4 is a detection area of an object 2. The RFID tag 5 has a tag ID for identifying the RFID tag 5. For example, when detecting the position of the object 2, the tag ID of the RFID tag 5 and position information indicating the position where the RFID tag 5 is placed may be associated with each other.

The RFID tag 5 transmits and receives data to and from the reader waveguide 4 by signals in the UHF (Ultra High Frequency) band. The RFID reader 6 reads management information that contains signal strength information of a response signal that is output from the RFID tag 5 and tag information (tag ID) of the RFID tag 5 through the reader waveguide 4. Note that a spacer or the like formed by dielectric may be placed between the RFID tag 5 and the reader waveguide 4. The distance between the RFID tag 5 and the object 2 and the distance between the RFID tag 5 and the reader waveguide 4 may be set by spacers or the like to thereby adjust the detection sensitivity.

Further, the RFID tag 5 has a tag antenna. The RFID tag 5 is placed on the reader waveguide 4, and the area above the RFID tag 5 is a detection area, and therefore the tag antenna and the object 2 are electromagnetically coupled when the object 2 comes close. The reader waveguide 4 is an open transmission line terminated with matching impedance, and it is placed at the position to be electromagnetically coupled with the tag antenna, and when the object is not in close vicinity (distant), it can transmit and receive radio signals to and from the RFID tag 5.

The RFID reader 6 includes a receiving unit that supplies power to the RFID tags 5 through the reader waveguide 4 by radio waves, and receives radio signals transmitted from the RFID tags 5 through the reader waveguide 4 and acquires information from the received radio signals, and a transmitting and receiving unit that transmits the information transmitted from the RFID tags 5 to the detection management device 1 as needed (for example, at specified intervals such as one second).

When the object 2 is not close to the position where the RFID tag 5 exists, the RFID reader 6 and each of the RFID tags 5 are able to communicate with each other by electromagnetic coupling with the reader waveguide 4 in a near-field. On the other hand, when the object 2 is close to the position above the place where the RFID tag 5 exists, the communication between the corresponding RFID tag 5 and the RFID reader 6 causes a change in the state of electromagnetic coupling by dielectric or metal of the object 2 itself, which results in interruption of information transmitted from the RFID tag 5 to the RFID reader 6 or reduction of signal strength. In this exemplary embodiment, the physical characteristics of the object 2 such as the position are detected using such a varation in signal strength (RSSI: Received Signal strength Indication) of a read signal read from the RFID tag 5.

Next, an element for implementing an object detection method according to this exemplary embodiment using the RFID reader 6, the reader waveguide 4 and the RFID tags 5 and the principle of detection are described hereinafter in detail. For example, the RFID reader 6, the reader waveguide 4 and the RFID tags 5 constitute a signal strength detection unit corresponding to the object 2, and the detection management device 1 (object detection unit) determines the physical characteristics of an object based on an output from the signal strength detection unit, thereby implementing the object detection method according to this exemplary embodiment.

FIG. 4 is a three-view drawing including the reader waveguide 4 with a microstrip line structure and the RFID tags 5 according to this exemplary embodiment. FIG. 4 shows an enlarged view of a part in which the object 2 is detected. For easier understanding of the detection principle, the case where an RFID tag is placed immediately above the strip line and one object comes close to one RFID tag is described in this example.

The reader waveguide 4 shown in FIG. 4, just like the one described above, is a traveling-wave waveguide for a reader using microstrip lines, which are one type of open transmission lines. The reader waveguide 4 includes a spacer 42, which is a dielectric layer, and a strip conductor 43 is formed on the upper surface of the spacer 42, and a ground plane 41 is formed on the lower surface of the spacer 42. The RFID tag 5 is placed above the strip conductor 43. Further, the object 2 comes close to the area above the RFID tag 5, where the RFID tag 5 is covered. The RFID tag 5 includes an RFID chip 201 and a tag antenna 202.

Figure 5:
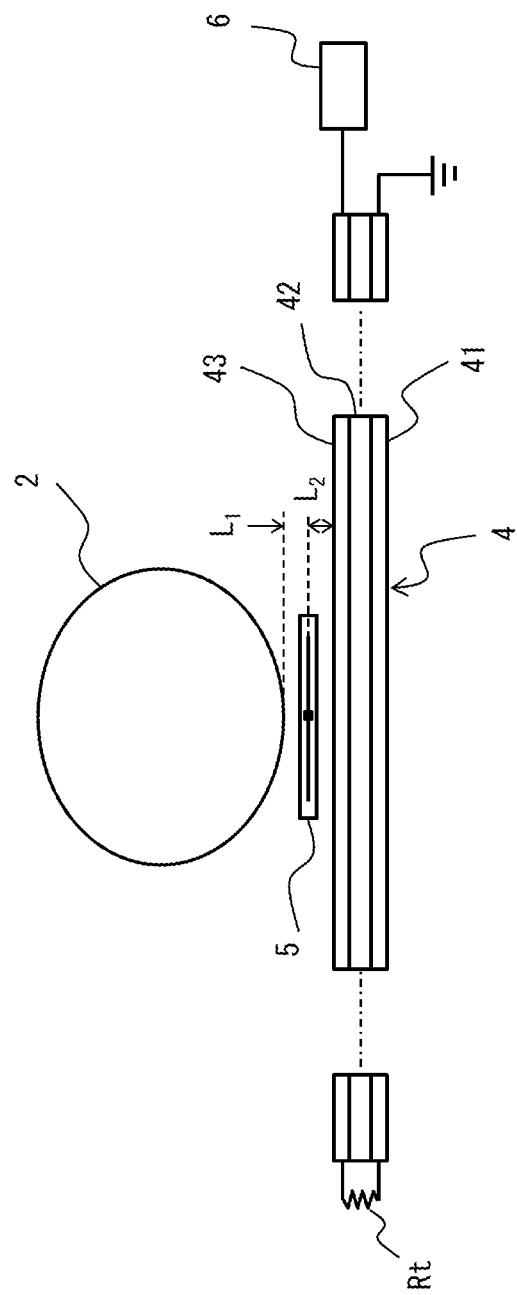
FIG. 5 is a side view showing an enlarged view of vicinity of an RFID tag according to the first exemplary embodiment.

FIG. 5 is a front view illustrating the reader waveguide 4, the RFID tag 5 and the RFID reader 6 according to this exemplary embodiment. Like FIG. 4, FIG. 5 shows an enlarged view of a part in which one object 2 comes close to the RFID tag 5.

In the reader waveguide 4 in FIG. 5, just like that in FIG. 4, the strip conductor 43 is formed on the upper surface of the spacer 42, and the ground plane 41 is formed on the lower surface of the spacer 42. One end of the strip conductor 43 and the ground plane 41 are connected to each other via a matching termination resistor Rt. With such a connection, the reader waveguide 4 is terminated with matching impedance. Further, the RFID reader 6 is connected at the other end of the strip conductor 43.

As one example, the object 2 is in close vicinity at a position in which a distance from the tag antenna 202 of the RFID tag 5 is a first distance $L_1$. The tag antenna 202 of the RFID tag 5 is placed at a position in which a distance from the strip conductor 43 is a second distance $L_2$.

Although only the distance relation of the object 2, the tag antenna 202 and the strip conductor 43 is shown in FIG. 5, in order to satisfy the above distance relation, when covering the RFID tag 5 with a plastic plate or the like, for example, the thickness of the plastic plate can be used. Specifically, the above-described first distance $L_1$ may be achieved by embedding the RFID tag 5 in a plastic plate and forming a sheet having the RFID tag using this plastic plate.

Further, by disposing a spacer below the RFID tags 5, it is possible to provide a board that supports the RFID tag and also achieve the above-described second distance $L_2$. This technique is one way to achieve the first distance $L_1$ and the second distance $L_2$, and another technique may be used. For example, in order to achieve the second distance $L_2$, the strip conductor 43 and the tag antenna 202 may be spaced apart from each other by the distance $L_2$ on the same plane.

Effects by the relations of the components of the object detection system according to this exemplary embodiment are described hereinafter in further detail with reference to FIGS. 4 and 5.

First, as shown in FIG. 4, in the object detection system according to the exemplary embodiment of the present invention, the object 2 is placed above the tag antenna 202 of the RFID tag 5 at the first distance $L_1$. Further, the strip conductor 43 connected to the RFID reader 6 is placed below the RFID tag 5 at the second distance $L_2$ as the line-of-sight distance between the strip conductor 43 and the tag antenna 202. In this manner, in this object detection system, the object 2 is placed in an area other than the area interposed between the reader waveguide 4 (the strip conductor 43) and the RFID tag 5. Thus, the line-of-sight between the reader waveguide 4 and the RFID tag 5 is not interrupted by the object 2.

In this object detection system, it is preferred to adjust the first distance L1 between the object 2 and the tag antenna 202 and the second distance $L_2$ being the line-of-sight distance between the tag antenna 202 and the reader waveguide 4 (the strip conductor 43). Further, in this object detection system, it is preferred to adjust a coupling coefficient $k_2$ between the object 2 and the tag antenna 202 and a coupling coefficient $k_1$ between the tag antenna 202 and the reader waveguide 4 (the strip conductor 43) by adjusting the first distance $L_1$ and the second distance $L_2$. In this object detection system, the signal strength between the tag antenna 202 and the reader waveguide 4 is changed according to the coupling coefficient $k_2$ that varies depending on the proximity of the object 2, and the physical characteristics of the object 2 are determined based on the change in signal strength.

The relations among the first distance $L_1$, the second distance $L_2$, and the coupling coefficients $k_1$ and $k_2$, and effects of the object management system according to this exemplary embodiment based on those settings are described hereinbelow.

First, while electromagnetic coupling is used in this exemplary embodiment, the coupling coefficients that indicate the strength of the electromagnetic coupling can be relatively easily evaluated by an electromagnetic field simulator. Further, in the description of the electromagnetic coupling, when the wavelength of a radio signal between the tag antenna 202 and the reader waveguide 4 is λ, an area whose distance from a wave source (for example, waveguide) is shorter than λ/2π (π is a circular constant) is referred to as a reactive near-field, an area whose distance from the wave source is longer than λ/2π and shorter than λ is referred to as a radiative near-field, and these two areas are collectively referred to as a near-field region.

In this near-field region, the electromagnetic field exhibits complexity, and a quasi-static electromagnetic field, an induced electromagnetic field and a radiated electromagnetic field have non-negligible intensity ratios, and the vector obtained by synthesizing those fields changes in different ways spatially and temporally. As one example, in the case where the wave source is an infinitesimal dipole antenna, when an electric field E[V/m] and a magnetic field H[A/m] generated by this antenna are represented in spherical coordinate systems (r,θ,φ) and phasor representation, they can be represented by the following Expressions (1) to (4).

$$E_\theta = \frac{ql}{4\pi\varepsilon}\left\{\frac{1}{r^3} + \frac{1}{r^2} \cdot \frac{1}{(\lambda/2\pi)} \cdot e^{j\frac{\pi}{2}} + \frac{1}{r} \cdot \frac{1}{(\lambda/2\pi)^2} \cdot e^{j\pi}\right\} \cdot e^{-jkr} \cdot \sin\theta \quad (1)$$

$$E_r = \frac{ql}{2\pi\varepsilon}\left\{\frac{1}{r^3} + \frac{1}{r^2} \cdot \frac{1}{(\lambda/2\pi)} \cdot e^{j\frac{\pi}{2}}\right\} \cdot e^{-jkr} \cdot \cos\theta \quad (2)$$

$$H_\phi = \frac{ql}{4\pi\sqrt{\varepsilon\mu}}\left\{\frac{1}{r^2} \cdot \frac{1}{(\lambda/2\pi)} \cdot e^{j\frac{\pi}{2}} + \frac{1}{r} \cdot \frac{1}{(\lambda/2\pi)^2} \cdot e^{j\pi}\right\} \cdot e^{-jkr} \cdot \sin\phi \quad (3)$$

$$E_\phi = H_\theta = H_r = 0 \quad (4)$$

In the above Expressions (1) to (4), charges stored in the infinitesimal dipole antenna is q[C], the length of the antenna is l[m], the wavelength is λ[m], and a distance from the wave source to an observation point is r[m]. Further, π is a circular constant, ∈ is a dielectric constant, and μ is a magnetic permeability. In the above Expressions (1) to (4), the term proportional to $1/r^3$ is the quasi-static electromagnetic field, the term proportional to $1/r^2$ is the induced electromagnetic field, and the term proportional to $1/r$ is the radiated electromagnetic field. Since these electromagnetic field components have different dependencies on the distance r, the relative intensity changes depending on the distance r.

FIG. 6 shows a table showing dependencies on the distance r standardized by the wavelength λ for the relative intensity of the quasi-electrostatic field, the induced electric field, and the radiated electric field in an electric field $E_\theta$. Note that the second row of the table in FIG. 6 shows the distances converted by the free space wavelength of 950 MHz, which is substantially the same as the frequency of the UHF-band RFID allowed in the Japanese Radio Act.

As is obvious from the table shown in FIG. 6, when the distance r increases, the intensity of each of the electric fields becomes small, and each component ratio changes accordingly. For example, in the region of r<λ/2π, the quasi-electrostatic field has the greatest intensity, the induced electric field has the next greatest intensity, and the radiated electric field has the least intensity, and in the region of r>λ/2π, the quasi-electrostatic field has the least intensity, the induced electric field has the next least intensity, and the radiated electric field has the greatest intensity. Further, in the region of r>λ, the contributions of the quasi-electrostatic field and the induced electric field are extremely small, and in a far field, which is the region of r>2λ, only the radiated electric field component substantially makes a contribution. On the other hand, in the region of r<λ, the quasi-electrostatic field and the induced electric field still sufficiently make contributions, and in the reactive near-field of r<λ/2π, the quasi-electrostatic field and the induced electric field make great contributions.

Further, as shown in Expressions (1) to (4), in contrast to the fact that the radiated electric field in a faraway field (r>>λ/2π) include θ-direction components only, the quasi-static electromagnetic field and the induced electric field include r-direction components and φ-direction components in addition to θ-direction components, thus having components in various directions. In general, in such a reactive near-field, compared to the radiated electromagnetic field that is radiated into the space from the antenna and propagates through the space, the quasi-static electromagnetic field and the induced electromagnetic field that remain near the antenna (waveguide) are dominant, and the absolute electromagnetic field intensity is also high. In the radiative near-field, the absolute electromagnetic field intensity generally becomes lower with an increase in the distance from the wave source. Further, the relative intensity of the quasi-static electromagnetic field and the induced electromagnetic field becomes abruptly lower with an increase in the distance from the wave source. As a result, the relative intensity of the radiated electromagnetic field to the other electromagnetic fields becomes higher. As described above, in the near-field region, the quasi-static electromagnetic field and the induced electromagnetic field exist, and, the existence of those electromagnetic fields causes coupling between the reader waveguide 4 and the tag antenna 202 and coupling between the tag antenna 202 and the object 2.

A passive RFID system that uses a normal UHF band or a microwave band has an advantage that it is highly sensitive to a material with high dielectric constant such as moisture and there is no need to exchange a battery. In such a passive RFID system, the distance r between the reader antenna corresponding to the reader waveguide 4 and the tag antenna satisfies the relation of r>λ, and the radiated electromagnetic field is used for the communication. In order to efficiently generate the radiated electromagnetic field, a resonant antenna such as a patch antenna is often used as the reader antenna. When such a resonant antenna is used in the near-field region of r<λ, the electromagnetic field intensity greatly varies depending on the location due to the standing waves in the resonant antenna. For example, the amplitude becomes the largest near the anti-node of the standing wave, and the amplitude becomes 0 at the node of the standing wave. Accordingly, when the distance r between the reader antenna and the tag antenna using such a resonant antenna satisfies the relation of r<λ, the tag antenna cannot receive signals from the reader antenna or the reception signal strength becomes extremely low at a position near the midpoint of the standing wave in the reader antenna in some cases. In other words, a dead area is created, which can adversely affect the usage.

On the other hand, the antennas may be electromagnetically coupled through the quasi-state electromagnetic field and the induced electromagnetic field existing in the near-field region of r<λ, or more preferably in the reactive near-field of r<λ/2π to thereby form a coupled circuit. In this case, there is no need for a wide space between the RFID reader and the RFID tag according to the condition. However, if the resonant antenna is merely used instead of the reader waveguide 4, a dead area is created, which can adversely affect the usage.

In view of the above, in the object management system according to this exemplary embodiment, the reader waveguide 4 to be connected to the RFID reader 6 is formed as the open transmission line terminated with matching impedance, and the RFID tag 5 is placed so that the open transmission line and the tag antenna 202 of the RFID tag 5 are electromagnetically coupled. In this object management system, with use of the open transmission line that emits less electric waves as the reader waveguide 4 of the RFID reader 6, the reader waveguide 4 and the tag antenna 202 are electromagnetically coupled through the quasi-static electromagnetic field and the induced electromagnetic field that are mainly generated around the open transmission line, thereby forming a coupled circuit. In other words, the open transmission line is used as a traveling wave antenna that operates in the near-field region. In this structure, there is no need to provide a wide space between the reader waveguide 4 and the RFID tag 5.

Further, because the communication between the reader waveguide 4 and the tag antenna 202 is carried out at a short distance through the coupled circuit, it is possible to suppress the occurrence of multipath phenomenon and false detection caused by a person or an object interposed between the reader waveguide 4 and the place where the object 2 is placed. Further, because the open transmission line terminated with matching impedance is used as the reader waveguide 4, the main components of the electromagnetic waves propagating through the antenna do not generate standing waves and propagate to the end terminated with matching impedance. Not generating standing waves strictly means that standing waves are sufficiently small, and usually means that the standing wave ratio is two or less.

Note that, in the case where the place to put the tag antenna 202 is restricted or in the case where the range where the tag antenna 202 operates effectively can be large to be able to ignore the effect of the node in standing wave components, larger standing waves may be used.

When the transmission line is terminated with sufficient matching accuracy, or when the electromagnetic waves propagating through the transmission line are sufficiently attenuated near the end, large standing waves are not generated in the transmission line and traveling waves serve as main components. The electromagnetic field distribution in such a transmission line can be used. In the electromagnetic field formed in the space around this line, the range of radiated electromagnetic field is relatively small, and the static electromagnetic field and the induced electromagnetic field serve as main components. The electromagnetic field intensity of the static electromagnetic field and the induced electromagnetic field is higher than the intensity of the radiated electromagnetic field, and even when the reader operates at the same power, the electromagnetic field intensity obtained by the RFID tag 5 is high. In other words, it is possible to prevent the radiated electromagnetic field that deteriorates the surrounding electromagnetic environment from appearing while ensuring the proper operation of the tags.

In the standing wave antenna such as a patch antenna that is commonly used, the electromagnetic field distribution around the antenna is extremely uneven according to the distribution of standing waves inside the antenna, and in order to avoid the dead area, the area where the object 2 can be managed needs to be limited. On the other hand, in the case of the reader waveguide formed as the open transmission line described in this exemplary embodiment, even near the waveguide, a part that does not change such as the node of standing waves does not exist in the electromagnetic field distribution, and it is thus possible to obtain necessary signal strength all over the place. Thus, in the near-field region as well, there is no significant unevenness of the electromagnetic field along the waveguide (antenna), and the area where the tag information of the RFID tag 5 cannot be read hardly appears. Thus, the flexibility of placing the reader waveguide 4 and the tag antenna 202 increases.

Further, in the object management system according to this exemplary embodiment, because the communication is performed through the electromagnetic coupling between the reader waveguide 4 and the tag antenna 202 using the traveling waves as signals, a dead area is not likely to appear in contrast to the resonant antenna, and it is thus possible to create the situation where there is no adverse effects on the usage. Therefore, the object detection system extends the transmission line, regardless of the wavelength, within the range where the intensity of the quasi-static electromagnetic field and the induced electromagnetic field generated around the open transmission line is high enough for the RFID tag 5 to operate, and it is thereby possible to widen the coverage area. Thus, in the object management system according to this exemplary embodiment, by use of the aforementioned open transmission line, it is possible to suppress the radiation loss of power and easily enlarge the coverage area.

The open transmission line in this specification is basically a transmission line that aims to suppress radiation and transmit electromagnetic waves in the longitudinal direction of the line, and it is an open line where the space between the line and the RFID tag 5 is not completely covered with metal in order to allow electromagnetic coupling to the RFID tag 5. As an example, the open transmission line may be a balanced two-wire transmission line or transmission lines similar to it, a transmission line such as a microstrip line, a coplanar line or a slot line, a grounded coplanar line or a triplate line, which are variations of those transmission lines. Alternatively, even in a strip line, the RFID tag 5 may be interposed between a ground conductor and a strip conductor, and the ground conductor may be provided with an appropriate open structure. Further, the open transmission line may be, although it depends on the condition for use, a plane-shaped (two-dimensional) antenna that transfers signals by changing the electromagnetic field to propagate between the narrow area interposed between a mesh-shaped conductor part and a sheet-shaped conductor part and the near-field leakage region outside of the mesh-shaped conductor part. On the other hand, a shield transmission line that does not generate such an electromagnetic field around the transmission line such as a coaxial cable or a waveguide tube that shields the transmission line cannot be used.

The traveling wave antenna that aims to perform electromagnetic radiation in a far field using so-called a crank-line antenna, a meander line antenna or a leaky coaxial cable that obtains a constant radiated electromagnetic field intensity by designing the crank shape for the radiation of electromagnetic waves from the open transmission line or actively using a higher-order mode is different from the open transmission line that is used for the object management system according to this exemplary embodiment. Since, in those traveling wave antennas, the radiation of electromagnetic waves preferentially occurs from cranks or slots periodically provided with a size of wavelength, which is a size of $\frac{1}{10}$ or more of the wavelength in general, the intensity of the electromagnetic field greatly varies depending on the place, which is similar to the resonant antenna described earlier. Thus, when used in the near-field region, reading of tag information becomes unstable or the tag cannot be read out in some places, which adversely affects the usage. Further, in the UHF-band RFID system, allocated frequencies are different in different countries and are generally distributed in the bandwidth of about 860 to 960 MHz, and this corresponds to a bandwidth ratio of about 10%, thus requiring serious changes to the design of the resonance point of the resonant antenna or the cycles of the cranks, the meanders, and the slots. On the other hand, in the object management system according to this exemplary embodiment, the open transmission line originally having an extremely wide bandwidth is used, and it is thereby possible to use the same antenna as the reader waveguide 4 without any special changes.

Further, in the object management system according to this exemplary embodiment, the display position 2a for placing the object 2 is provided near the RFID tag 5 so that the object 2 and the tag antenna 202 of the RFID tag 5 are electromagnetically coupled. Thus, when there is the object 2, the object 2 and the tag antenna 202 form the coupled circuit, and therefore the resonance frequency of the tag antenna 202 changes or the feed-point impedance of the tag antenna 202 changes compared to the case where there is no object 2. The tag antenna 202 is created to resonate at a frequency of a signal to be used for the communication in the free space, and further the feed-point impedance of the tag antenna 202 is adjusted to maximize the reception sensitivity. Thus, the above-described changes decrease the reception sensitivity and causes adverse effects on the operation of the tag antenna 202 when transmitting a reflected signal to the RFID reader 6. As a result, the power reception sensitivity for a signal to be used for the communication decreases. Further, the transmission power of a signal reflected by the RFID tag 5 also decreases. Accordingly, the RFID tag 5 cannot receive a signal from the RFID reader 6, the received power intensity of a signal is too low to secure the operating power of the tag, or the tag cannot generate a reflected electromagnetic field with sufficient intensity. As a result, the RFID reader 6 can no longer read the tag information of the RFID tag 5. Alternatively, the intensity or the phase of the reflected electromagnetic field that reaches the RFID reader 6 largely varies with a change in the resonance frequency of the tag or the like. Thus, when the object 2 is at the display position 2a, the tag information cannot be read, or the intensity of the reflected electromagnetic field from the RFID tag 5 largely varies compared to the case where there is no object 2, and therefore the object management system can detect the presence of the object 2. Stated differently, as a result that a change has occurred in the operating characteristics of the tag antenna 202 depending on the presence or absence of the object 2, the RFID reader 6 can detect a change in the intensity of a reflected signal from the RFID tag 5, and, based on this detection result, the object management system according to this exemplary embodiment can detect the physical characteristics of the object. Note that it is feasible to make adjustment so that the reception sensitivity increases when the object 2 exists.

The relationship between a variation in signal strength of the RFID tag 5 and the physical characteristics of the object 2 is described hereinafter. The physical characteristics are physical characteristics of an object including the characteristics such as a material and the state such as a position, which includes the position, size, material and shape of an object, for example. The position of an object is a distance (horizontal distance), direction, height (vertical distance) and the like.

Figure 7B:
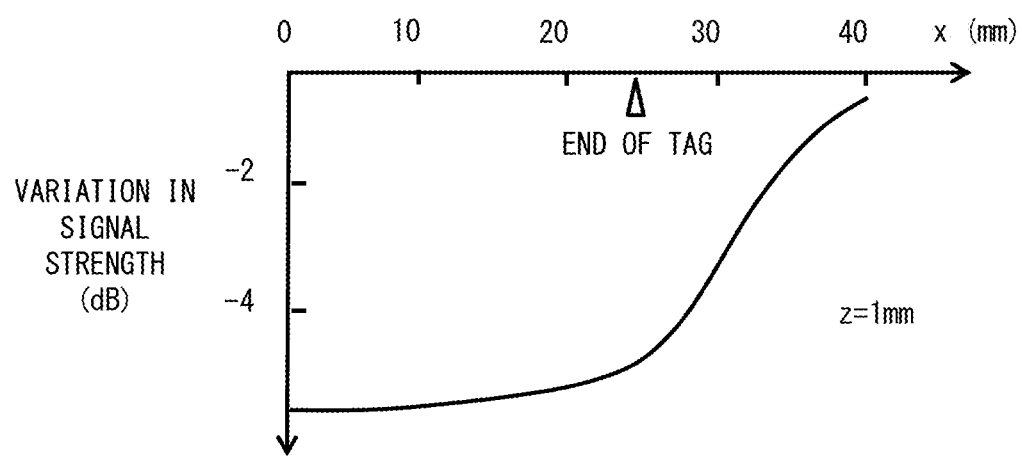
FIG. 7B is a diagram illustrating a relationship between a horizontal distance of an object and a variation in signal strength according to the first exemplary embodiment.

FIGS. 7A and 7B show a relationship between a distance (horizontal distance) from an RFID tag to an object in the horizontal direction (x-direction) and a variation in signal strength of the RFID tag. As shown in FIG. 7A, when the object 2 is placed at a position in the x-direction from the RFID tag 5, a variation in signal strength of the RFID tag 5 varies as shown in FIG. 7B. Note that a variation in signal strength is a relative value that represents the strength of a reflected signal from the RFID tag 5 which is received by the RFID reader 6 in units of dB, relative to the case where the object 2 does not exist.

FIG. 7B shows an example in which the height (z-direction) is fixed to 1 mm and, assuming that the height and the direction are constant, a variation in signal strength is a function with a variable of a distance (position) x. Note that FIG. 7B is just an example, and a function representing this relationship depends on the design of the tag antenna.

As shown in FIG. 7B, because the object 2 is placed on the RFID tag 5 and the signal strength of the RFID tag 5 decreases from the center (x=0) of the RFID tag 5 to the vicinity of the end (x=about 25 mm) of the RFID tag 5, a variation in signal strength is large on the negative side. As it is away from the vicinity of the end of the RFID tag 5, the signal strength of the RFID tag 5 increases, and the value of a variation in signal strength approximates to 0 dB. By using the relationship between the distance and a variation in signal strength as shown in FIG. 7B, it is possible to estimate (detect) the distance (horizontal distance) of the object 2 according to a variation in signal strength of the RFID tag 5 in the case where the condition such as the height of the object 2 is fixed.

Figure 8A:
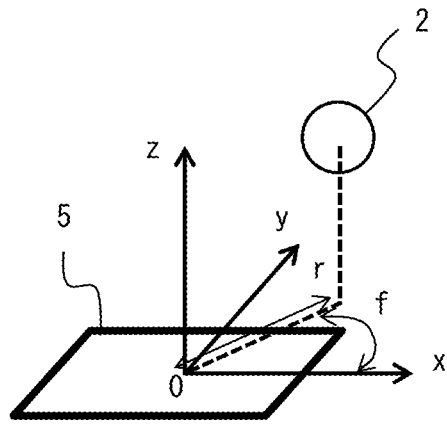
FIG. 8A is a diagram illustrating a relationship among a horizontal distance and a direction of an object and a variation in signal strength according to the first exemplary embodiment.
Figure 8B:
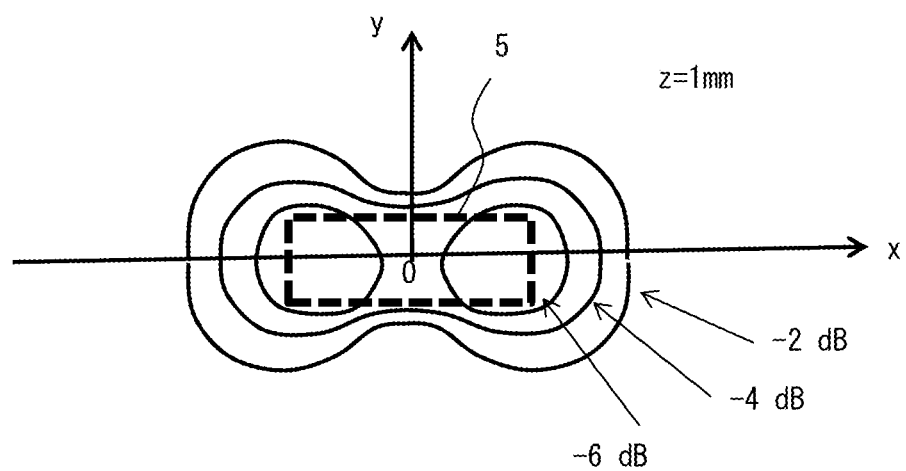
FIG. 8B is a diagram illustrating a relationship among a horizontal distance and a direction of an object and a variation in signal strength according to the first exemplary embodiment.

FIGS. 8A and 8B show a relationship between a distance and a direction from an RFID tag to an object in a horizontal direction (x-direction and y-direction) and a variation in signal strength of the RFID tag. As shown in FIG. 8A, when the object 2 is placed at a position in the x-direction and the y-direction from the RFID tag 5, a variation in signal strength of the RFID tag 5 varies like the isoline shown in FIG. 8B.

FIG. 8B shows an example in which the height (z-direction) is fixed to 1 mm and, assuming that the height is constant, a variation in signal strength is a function with a variable of a position on plane coordinates. For example, a function indicating a position on plane coordinates may be represented as a function f(x,y) where a distance x in the x-direction and a distance y in the y-direction are variables, or represented as a function f(r',ϕ') where a distance r' from the origin and an angle ϕ' (azimuth) from the x-axis are variables. Note that FIG. 8B is just an example, and a function representing this relationship depends on the design of the tag antenna.

In the example of FIG. 8B, the value of a variation in signal strength is −6 dB, which is large on the negative side, at the vicinity of both ends of the RFID tag 5 in the x-direction (long-side direction), and as it is away from the vicinity of both ends of the RFID tag 5 in the x-direction, the value of a variation in signal strength suddenly becomes smaller, like −4 dB and −2 dB, to approximate to 0 dB. Further, the value of a variation in signal strength is −4 dB at the vicinity of both ends of the RFID tag 5 in the y-direction (short-side direction), and as it is away from the vicinity of both ends of the RFID tag 5, the value of a variation in signal strength becomes −2 dB, that is, the absolute value becomes smaller while maintaining the negative sign. By using the relationship between the distance and the direction on plane coordinates and a variation in signal strength as shown in FIG. 8B, it is possible to estimate (detect) the distance (horizontal distance) and the direction of the object 2 according to a variation in signal strength of the RFID tag 5 in the case where the condition such as the height of the object 2 is fixed.

Figure 9A:
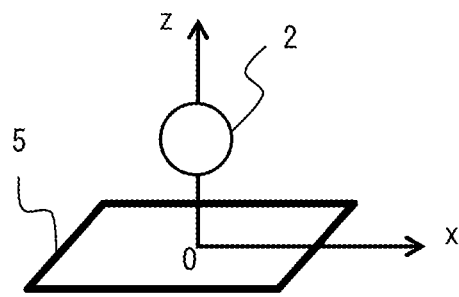
FIG. 9A is a diagram illustrating a relationship between a vertical distance of an object and a variation in signal strength according to the first exemplary embodiment.
Figure 9B:
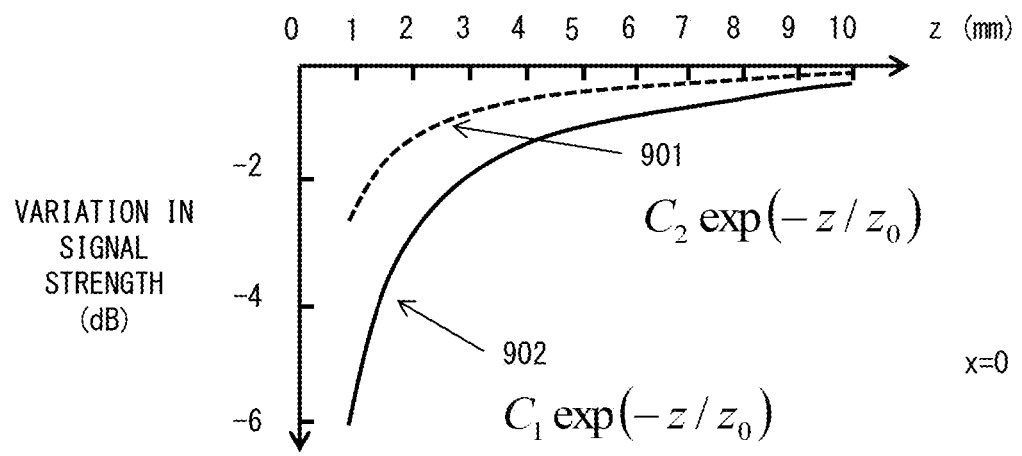
FIG. 9B is a diagram illustrating a relationship between a vertical distance of an object and a variation in signal strength according to the first exemplary embodiment.

FIGS. 9A and 9B show a relationship between a height (vertical distance) from an RFID tag to an object in the vertical direction (z-direction) and a material of the object, and a variation in signal strength of the RFID tag. As shown in FIG. 9A, when the object 2 is placed at a position in the z-direction from the RFID tag 5, a variation in signal strength of the RFID tag 5 varies as shown in FIG. 9B.

FIG. 9B shows an example in which the horizontal direction (x-direction) is fixed to 0 mm and, assuming that the distance in the horizontal direction is constant, a variation in signal strength is a function with a variable of a height z. Note that FIG. 9B is just an example, and a function representing this relationship depends on the design of the tag antenna.

As shown in FIG. 9B, when the object 2 comes close to the position above the RFID tag 5, the signal strength of the RFID tag 5 suddenly decreases, and therefore the absolute value of a variation in signal strength increases while maintaining the negative sign in an almost monotone way as the height z becomes smaller. On the contrary, when the object 2 gets away from the position above the RFID tag 5, the signal strength of the RFID tag 5 suddenly increases, and therefore the value of a variation in signal strength gradually approximates to 0 dB in an almost monotone way as the height z becomes larger.

Further, because electromagnetic coupling state is different depending on the material of an object, a variation in signal strength of the RFID tag varies. For example, when the material is metal or the like, electromagnetic coupling strength is high, and thus the absolute value of a variation in signal strength varies largely, and when the material is nonmetal or the like, electromagnetic coupling strength is low, and thus the absolute value of a variation in signal strength varies only slightly. In the example of FIG. 9B, with a material 1, the dependence of a variation in signal strength on height is low as indicated by a curved line 901 and, with a material 2, the dependence of a variation in signal strength on height is high as indicated by a curved line 902.

By using the relationship between the height and a variation in signal strength as shown in FIG. 9B, it is possible to estimate (detect) the height (vertical distance) of the object 2 according to a variation in signal strength of the RFID tag 5 in the case where the condition such as the horizontal distance of the object 2 is fixed. Further, by using the relationship between the material of an object and a variation in signal strength as shown in FIG. 9B, it is possible to estimate (detect) the material of the object according to a variation in signal strength of the RFID tag 5 in the case where the condition such as the height of the object 2 is fixed.

As described above, a variation in signal strength of the RFID tag can be considered as a function of the distance and direction from the RFID tag to an object and the material, size and shape of the object. The following Expression (5) is one example of a relational expression representing the relationship between a variation in signal strength of the RFID tag and the physical characteristics of the object such as the distance.

$$\text{Variation in signal strength} = P1 \times P2 \times P3 \quad (5)$$
$$= C_{material, size, shape} \times$$
$$\exp(-z/z_0) \times f(r, \phi)$$

Expression (5) sets, as a variation in signal strength, a result of multiplying a characteristic parameter P1 that depends on the material, size and shape of the object 2, a vertical parameter P2 that depends on the height in the vertical direction to the object 2, and a horizontal parameter P3 that depends on the distance and direction in the horizontal direction to the object 2. The characteristic parameter P1 is a function (constant) where the material, size and shape of the object 2 are variables. The vertical parameter P2 is a function where the height is a variable (z) as in FIG. 9B. The horizontal parameter P3 is a function where the distance (horizontal distance) and the direction are variables $(r, \phi)$ as in FIG. 8B. For example, the vertical parameter P2 and the horizontal parameter P3 serve also as position parameters indicating the position of the object 2. In this exemplary embodiment, the physical characteristics contained in each parameter are detected from the measured variation in signal strength based on the relationship between a variation in signal strength and each parameter in Expression (5).

The configuration of the detection management device 1 according to this exemplary embodiment is described hereinafter with reference to FIG. 10. In the exemplary configuration shown in FIG. 10, the detection management device 1 includes a detection information database 11, an input unit 12, a setting unit 13, a physical characteristics detection unit 14, and a display unit 15.

Note that, although those blocks are described as the functions of the detection management device 1 in this example, some or all of those blocks may be included in the RFID reader 6, and necessary information may be transmitted from the RFID reader 6 to the detection management device 1. Further, the configuration of the functional blocks is by way of illustration only, and another configuration may be employed as long as the detection processing according to this exemplary embodiment, which is described later, can be achieved.

For example, the detection management device 1 includes a commonly used computer device (server device). The detection management device 1 includes a central processing unit (CPU), a storage device such as a memory or a hard disk, an input device such as a keyboard, a display device such as a liquid crystal display, and a communication unit to be connected to a communication network 3. The storage device stores a detection program for implementing detection processing according to this exemplary embodiment, and the CPU executes this program to implement each functional block. Note that the detection management device 1 is not limited to a single computer, and it may be composed of a plurality of computers.

The detection program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

The detection information database 11 stores information necessary for detecting the object 2. In this exemplary embodiment, the detection is performed based on the relationship of Expression (5), and therefore it stores physical characteristics information indicating the relationship between a variation in signal strength and physical characteristics like Expression (5). As the physical characteristics information, information corresponding to the parameters P1 to P3 of Expression (5) is stored.

For example, the detection information database 11 stores characteristic parameter information 11a related to the characteristic parameter P1 of Expression (5), vertical parameter information 11b related to the vertical parameter P2 of Expression (5), and horizontal parameter information 11c related to the horizontal parameter P3 of Expression (5). In other words, the detection information database 11 stores a characteristic parameter storage unit that stores the characteristic parameter information 11a, a vertical parameter storage unit that stores the vertical parameter information 11b, and a horizontal parameter storage unit that stores the horizontal parameter information 11c. Note that there is a case where the characteristic parameter P1, the vertical parameter P2 and the horizontal parameter P3 are not independent parameters. In this case, the relationship of the function $f(z,r,\phi)$ may be associated in a table of the detection information database 11, for example.

The detection information database 11 may store function expressions representing the correspondence in Expression (5) as the characteristic parameter information 11a, the vertical parameter information 11b and the horizontal parameter information 11c, or may store table information representing the correspondence in Expression (5). The detection information database 11 at least stores information that associates three or more values of signal strength and the physical characteristics of the object.

FIG. 11 shows one example of the characteristic parameter information 11a. In the example of FIG. 11, the characteristic parameter information 11a is table information representing the correspondence between the material, size and shape and the characteristic parameter P1. For example, as shown in FIG. 11, the characteristic parameter information 11a stores the characteristic parameter P1 corresponding to the shape and size for each material. As one example, the material is a metal, a nonmetal, a human body or the like, the shape is a sphere, a cone, a circular cylinder, a rectangular solid or the like, and the size is a size in the horizontal direction, a size (thickness) in the vertical direction or the like. The material may be a combination of a plurality of materials. Further, the shape and size may be set by an arbitrary way as long as an outer shape can be specified.

Figures 12, 13:
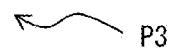
FIG. 12 is a view showing an example of data stored in the detection management device according to the first exemplary embodiment.
FIG. 13 is a view showing an example of data stored in the detection management device according to the first exemplary embodiment.

FIG. 12 shows one example of the vertical parameter information 11b. In the example of FIG. 12, the vertical parameter information 11b is table information representing the correspondence between a height in the vertical direction and the vertical parameter P2. As shown in FIG. 12, the vertical parameter information 11b stores the vertical parameter P2 for each height z.

FIG. 13 shows one example of the horizontal parameter information 11c. In the example of FIG. 13, the horizontal parameter information 11c is table information representing the relationship between a distance and a direction in the horizontal direction and the horizontal parameter P3. For example, as shown in FIG. 13, the horizontal parameter information 11c stores the horizontal parameter P3 corresponding to the distance r for each direction (angle) $\phi$.

Figure 10:
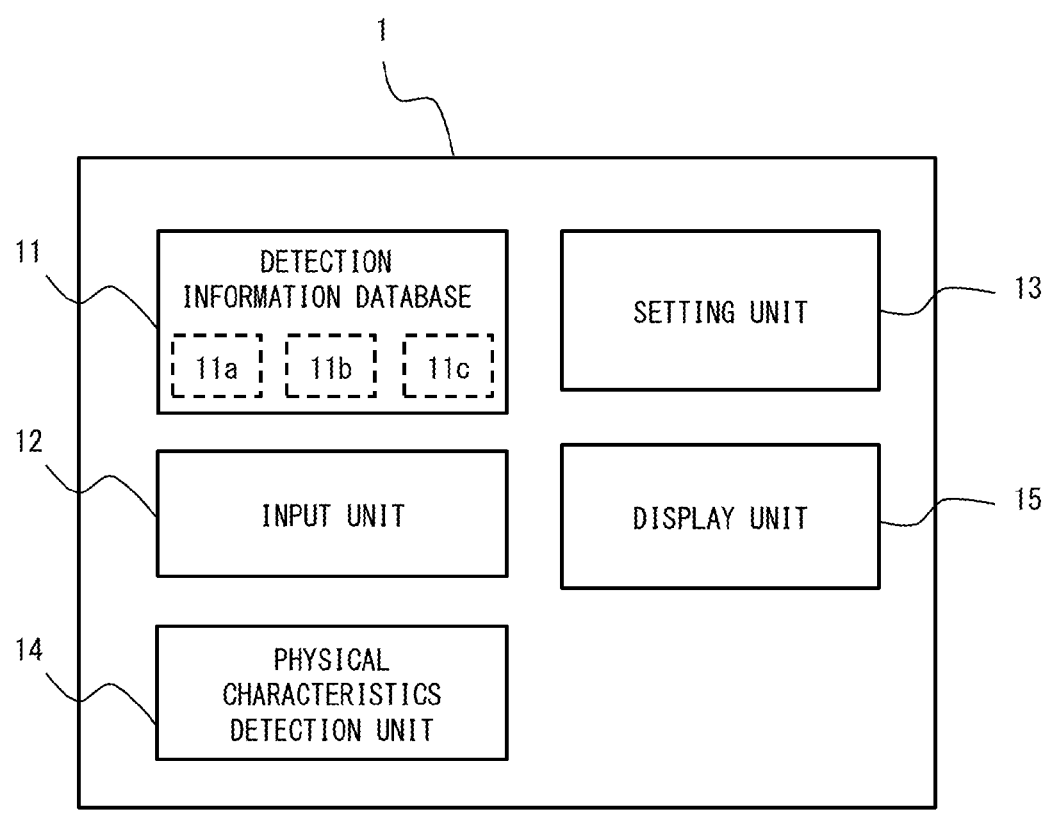
FIG. 10 is a block diagram showing the configuration of a detection management device according to the first exemplary embodiment.

The elements in FIG. 10 are further described hereinbelow. The input unit 12 outputs externally input information to each block. The input unit 12 serves as a signal strength acquisition unit, and it receives signal strength information and tag ID input (acquired) from the RFID reader 6 and output the input (acquired) signal strength information and tag ID to the physical characteristics detection unit 14. Further, the input unit 12 also serves as a signal strength variation calculation unit, and it calculates a variation in signal strength from the acquired signal strength and outputs the calculated variation in signal strength to the physical characteristics detection unit 14. For example, the input unit 12 stores the signal strength acquired periodically into the detection information database 11, compares the signal strength acquired last time and the signal strength acquired this time and thereby calculates a variation in signal strength.

The setting unit 13 makes settings necessary for detection of the physical characteristics of the object 2. In this exemplary embodiment, detection is performed based on the relationship of Expression (5), and therefore conditions for detection to obtain physical characteristics from Expression (5) are set. For example, in the case of detecting the height of the object 2, the setting unit 13 sets conditions for parameters other than the height (vertical distance) of Expression (5). The setting unit 13 may set may set all parameters according to a user's input operation or the like or may automatically set all parameters other than the one to be detected.

The physical characteristics detection unit (object detection unit) 14 detects (estimates) the physical characteristics of the object 2 according to a variation in signal strength of the RFID tag 5 received from the RFID reader 6. The physical characteristics detection unit 14 detects the physical characteristics according to a variation in signal strength based on the relationship of Expression (5) as described above. In this example, any of the material, size, shape, height, distance and direction is calculated as the physical characteristics based on Expression (5). Note that, although the physical characteristics of the object 2 are detected according to a variation in signal strength of the RFID tag 5 in this exemplary embodiment, the physical characteristics of the object 2 may be detected according to the signal strength of the RFID tag 5. By using a variation in signal strength, a relative change in accordance with the movement of the object 2 can be detected, and it is thereby possible to accurately detect the object 2.

The display unit 15 displays a processing result of each block and the like according to need. For example, the display unit 15 displays the signal strength or a variation in signal strength acquired by the input unit 12, or displays the physical characteristics such as a position or a height detected by the physical characteristics detection unit 14.

An object detection method (object detection process) that is performed in the object detection system according to this exemplary embodiment is described hereinafter with reference to FIG. 14.

Figure 14:
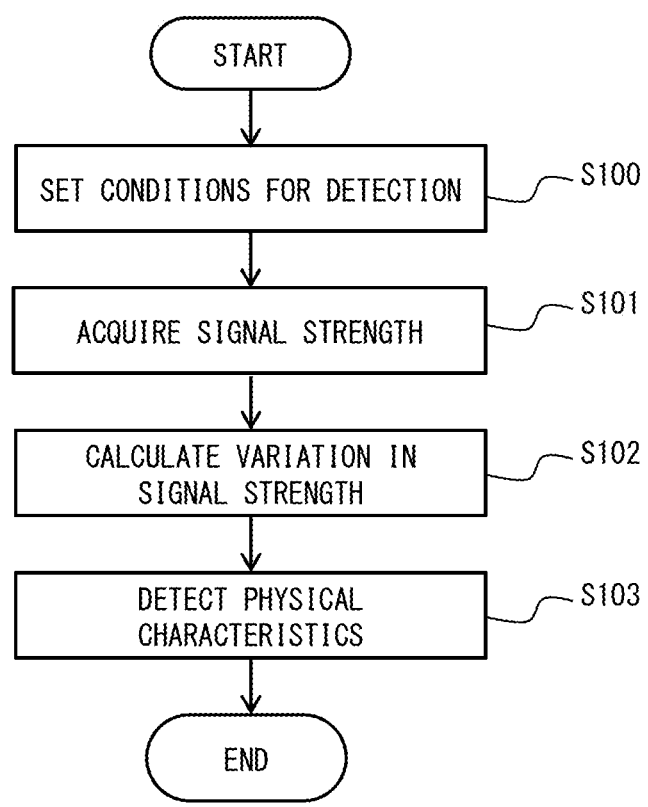
FIG. 14 is a flowchart showing an object detection method according to the first exemplary embodiment.

As shown in FIG. 14, the setting unit 13 first sets detection conditions for detecting specific physical characteristics (S100). The setting unit 13 specifies the physical characteristics to be detected and sets conditions for parameters other than the specified physical characteristics. The setting of detection conditions may be performed at any timing before the detection processing in S103.

Next, the RFID reader 6 reads the RFID tag 5, and the input unit 12 acquires the signal strength of the RFID tag 5 from the RFID reader 6 (S101). For example, the input unit 12 periodically acquires the tag ID and the signal strength of the RFID tag 5 from the RFID reader 6, and stores the acquired tag ID and signal strength in association with each other into the detection information database 11. The RFID reader 6 may periodically transmit the signal strength read from the RFID tag 5 to the input unit 12, or the input unit 12 may periodically transmit a read command for reading the RFID tag 5 to the RFID reader 6 and acquire the signal strength of the RFID tag 5.

Then, the input unit 12 calculates a variation in signal strength based on the acquired signal strength (S102). The input unit 12 calculates a variation in signal strength from a difference between the signal strength acquired last time and the signal strength acquired this time in S101. Note that the RFID reader 6 may calculate a variation in signal strength, and the input unit 12 may acquire the variation in signal strength from the RFID reader 6. Further, a variation in signal strength may be calculated in the physical characteristics detection unit 14 or the like other than the input unit 12.

After that, the physical characteristics detection unit 14 detects the physical characteristics of the object 2 based on the calculated variation in signal strength (S103). The physical characteristics detection unit 14 detects the physical characteristics of the object 2 according to the variation in signal strength calculated in S102 in accordance with the detection conditions set in S100. For example, the physical characteristics detection unit 14 refers to Expression (5) stored in the detection information database 11, substitutes the parameters of the detection conditions and a variation in signal strength into Expression (5) and thereby calculates the physical characteristics to be detected. After S103, the display unit 15 displays the detected physical characteristics and the like according to need.

An example of detecting each of physical characteristics is described with reference to the flowchart of FIG. 14. Note that, although it is described by reference to the parameters of Expression (5), the characteristic parameter P1, the vertical parameter P2 and the horizontal parameter P3 are not necessarily independent parameters, and the parameters P1 to P3 are not necessarily combined in the following description.

<Case of Detecting Distance (Horizontal Distance)>

In the case of detecting the distance of the object 2, the setting unit 13 sets the parameters of Expression (5) excluding the distance in S100. Specifically, it sets the material, size and shape as the characteristic parameter P1, the height as the vertical parameter P2 and the direction as the horizontal parameter P3.

Then, after the acquisition of signal strength (S101) and the calculation of a variation in signal strength (S102), the physical characteristics detection unit 14 substitutes the parameters excluding the distance set in S100 and a variation in signal strength into Expression (5) and thereby calculates the distance of the RFID tag 5.

For example, when using the information of FIGS. 11 to 13, it refers to the characteristic parameter information 11a in FIG. 11 and determines the characteristic parameter P1 from the set material, size and shape, and refers to the vertical parameter information 11b in FIG. 12 and determines the vertical parameter P2 from the set height. By substituting the determined characteristic parameter P1 and vertical parameter P2 and the acquired variation in signal strength into Expression (5), the horizontal parameter P3 is obtained. Further, it refers to the horizontal parameter information 11c in FIG. 13 and calculates the distance r to be detected from the set direction $\phi$ and the obtained horizontal parameter P3.

<Case of Detecting Direction (Horizontal Angle)>

In the case of detecting the distance of the object 2, the setting unit 13 sets the parameters of Expression (5) excluding the direction in S100. Specifically, it sets the material, size and shape as the characteristic parameter P1, the height as the vertical parameter P2 and the distance as the horizontal parameter P3.

Then, after the acquisition of signal strength (S101) and the calculation of a variation in signal strength (S102), the physical characteristics detection unit 14 substitutes the parameters excluding the direction set in S100 and a variation in signal strength into Expression (5) and thereby calculates the direction of the RFID tag 5.

For example, when using the information of FIGS. 11 to 13, it refers to the characteristic parameter information 11a in FIG. 11 and determines the characteristic parameter P1 from the set material, size and shape, and refers to the vertical parameter information 11b in FIG. 12 and determines the vertical parameter P2 from the set height. By substituting the determined characteristic parameter P1 and vertical parameter P2 and the acquired variation in signal strength into Expression (5), the horizontal parameter P3 is obtained. Further, it refers to the horizontal parameter information 11c in FIG. 13 and calculates the direction $\phi$ to be detected from the set distance r and the obtained horizontal parameter P3.

<Case of Detecting Height (Vertical Distance)>

In the case of detecting the height of the object 2, the setting unit 13 sets the parameters of Expression (5) excluding the height in S100. Specifically, it sets the material, size and shape as the characteristic parameter P1 and the distance and direction as the horizontal parameter P3.

Then, after the acquisition of signal strength (S101) and the calculation of a variation in signal strength (S102), the physical characteristics detection unit 14 substitutes the parameters excluding the height set in S100 and a variation in signal strength to Expression (5) and thereby calculates the height of the RFID tag 5.

For example, when using the information of FIGS. 11 to 13, it refers to the characteristic parameter information 11a in FIG. 11 and determines the characteristic parameter P1 from the set material, size and shape, and refers to the horizontal parameter information 11c in FIG. 13 and determines the horizontal parameter P3 from the set distance and direction. By substituting the determined characteristic parameter P1 and horizontal parameter P3 and the acquired variation in signal strength into Expression (5), the vertical parameter P2 is obtained. Further, it refers to the vertical parameter information 11b in FIG. 12 and calculates the height z to be detected from the obtained vertical parameter P2.

<Case of Detecting Material>

In the case of detecting the material of the object 2, the setting unit 13 sets the parameters of Expression (5) excluding the material in S100. Specifically, it sets the size and shape as the characteristic parameter P1, the height as the vertical parameter P2 and the distance and direction as the horizontal parameter P3.

Then, after the acquisition of signal strength (S101) and the calculation of a variation in signal strength (S102), the physical characteristics detection unit 14 substitutes the parameters excluding the material set in S100 and a variation in signal strength into Expression (5) and thereby calculates the material of the RFID tag 5.

For example, when using the information of FIGS. 11 to 13, it refers to the vertical parameter information 11b in FIG. 12 and determines the vertical parameter P2 from the set height, and refers to the horizontal parameter information 11c in FIG. 13 and determines the horizontal parameter P3 from the set distance and direction. By substituting the determined vertical parameter P2 and horizontal parameter P3 and the acquired variation in signal strength into Expression (5), the characteristic parameter P1 is obtained. Further, it refers to the characteristic parameter information 11a in FIG. 11 and calculates the material to be detected from the set size and shape and the obtained characteristic parameter P1.

<Case of Detecting Shape>

In the case of detecting the shape of the object 2, the setting unit 13 sets the parameters of Expression (5) excluding the shape in S100. Specifically, it sets the material and size as the characteristic parameter P1, the height as the vertical parameter P2 and the distance and direction as the horizontal parameter P3.

Then, after the acquisition of signal strength (S101) and the calculation of a variation in signal strength (S102), the physical characteristics detection unit 14 substitutes the parameters excluding the shape set in S100 and a variation in signal strength into Expression (5) and thereby calculates the shape of the RFID tag 5.

For example, when using the information of FIGS. 11 to 13, it refers to the vertical parameter information 11b in FIG. 12 and determines the vertical parameter P2 from the set height, and refers to the horizontal parameter information 11c in FIG. 13 and determines the horizontal parameter P3 from the set distance and direction. By substituting the determined vertical parameter P2 and horizontal parameter P3 and the acquired variation in signal strength into Expression (5), the characteristic parameter P1 is obtained. Further, it refers to the characteristic parameter information 11a in FIG. 11 and calculates the size to be detected from the set material and shape and the obtained characteristic parameter P1.

<Case of Detecting Size>

In the case of detecting the size of the object 2, the setting unit 13 sets the parameters of Expression (5) excluding the size in S100. Specifically, it sets the material and shape as the characteristic parameter P1, the height as the vertical parameter P2 and the distance and direction as the horizontal parameter P3.

Then, after the acquisition of signal strength (S101) and the calculation of a variation in signal strength (S102), the physical characteristics detection unit 14 substitutes the parameters excluding the size set in S100 and a variation in signal strength to Expression (5) and thereby calculates the size of the RFID tag 5.

For example, when using the information of FIGS. 11 to 13, it refers to the vertical parameter information 11b in FIG. 12 and determines the vertical parameter P2 from the set height, and refers to the horizontal parameter information 11c in FIG. 13 and determines the horizontal parameter P3 from the set distance and direction. By substituting the determined vertical parameter P2 and horizontal parameter P3 and the acquired variation in signal strength into Expression (5), the characteristic parameter P1 is obtained. Further, it refers to the characteristic parameter information 11a in FIG. 11 and calculates the shape to be detected from the set material and shape and the obtained characteristic parameter P1.

As described above, in this exemplary embodiment, it is possible to detect various physical characteristics of an object based on the relationship between the signal strength of the RFID tag and the physical characteristics of the object. Particularly, because the physical characteristics corresponding to the signal strength are detected based on the relationship between multivalued (three or more values of) signal strength and physical characteristics as in Expression (5) and FIGS. 11 to 13, it is possible to improve the detection accuracy.

Second Exemplary Embodiment

A second exemplary embodiment is described hereinafter with reference to the drawings. In this exemplary embodiment, an example in which two RFID tags are placed, which is different from the first exemplary embodiment is described.

Figure 15:
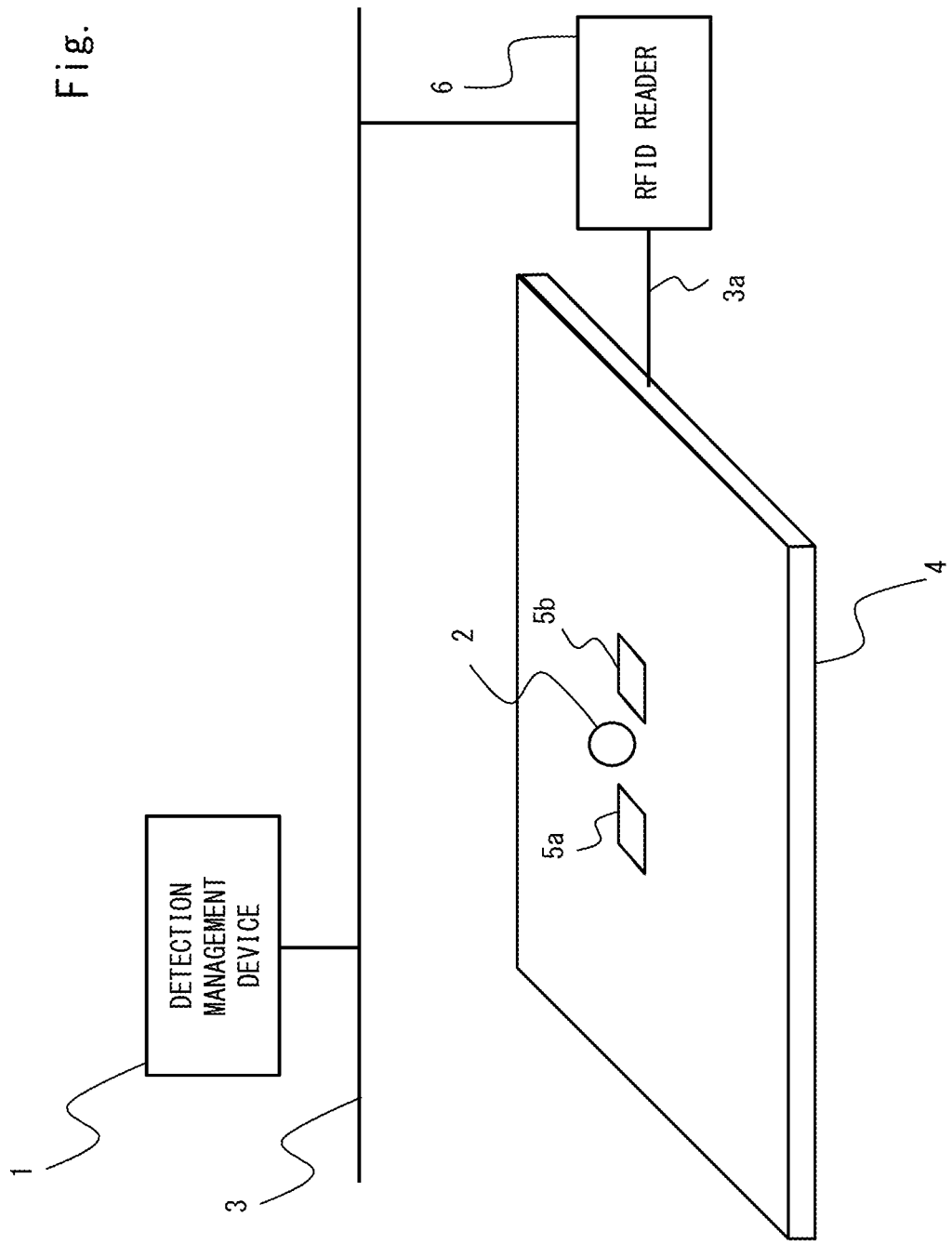
FIG. 15 is a schematic diagram showing the configuration of an object detection system according to a second exemplary embodiment.

FIG. 15 shows an example of the configuration of an object detection system according to this exemplary embodiment. As shown in FIG. 15, the object detection system according to this exemplary embodiment includes a detection management device 1, an RFID reader 6, a reader waveguide 4, and an RFID tag 5 just like in the first exemplary embodiment. The configuration of the detection management device 1 is the same as that of FIG. 10 illustrating the first exemplary embodiment.

In this exemplary embodiment, two RFID tags 5a and 5b are placed. As shown in FIG. 15, the RFID tags 5a and 5b are placed side by side on the reader waveguide 4. For example, the RFID tags 5a and 5b are placed adjacent to each other so that their detection ranges where the object 2 is detectable overlap. Specifically, the detection ranges in which a variation in signal strength can be detected as shown in FIG. 8B overlap in the area between the RFID tags 5a and 5b.

Figure 16:
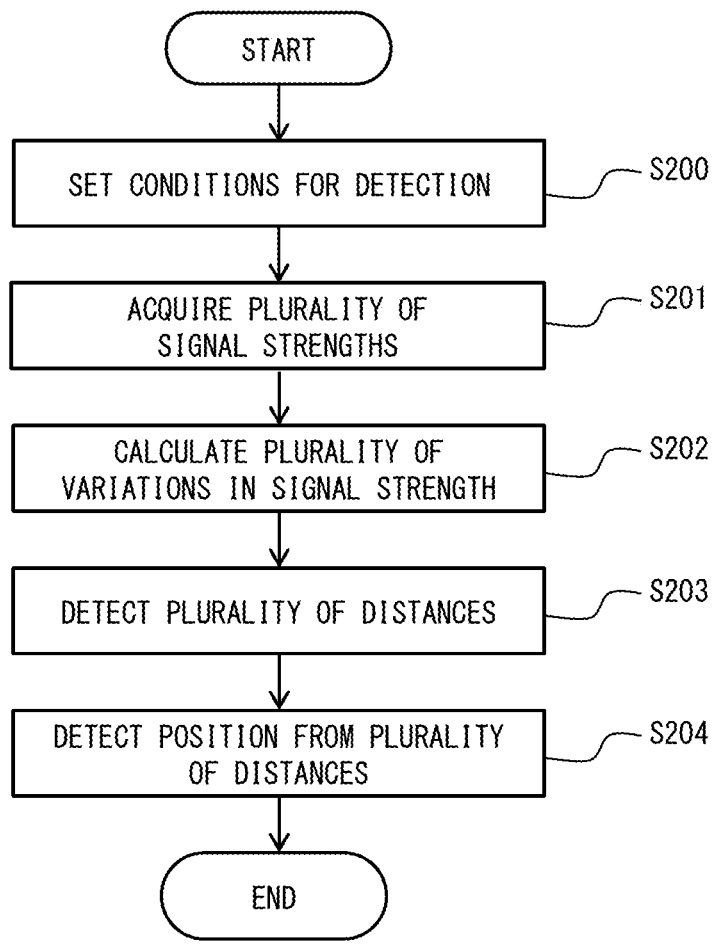
FIG. 16 is a flowchart showing an object detection method according to the second exemplary embodiment.
Figure 17:
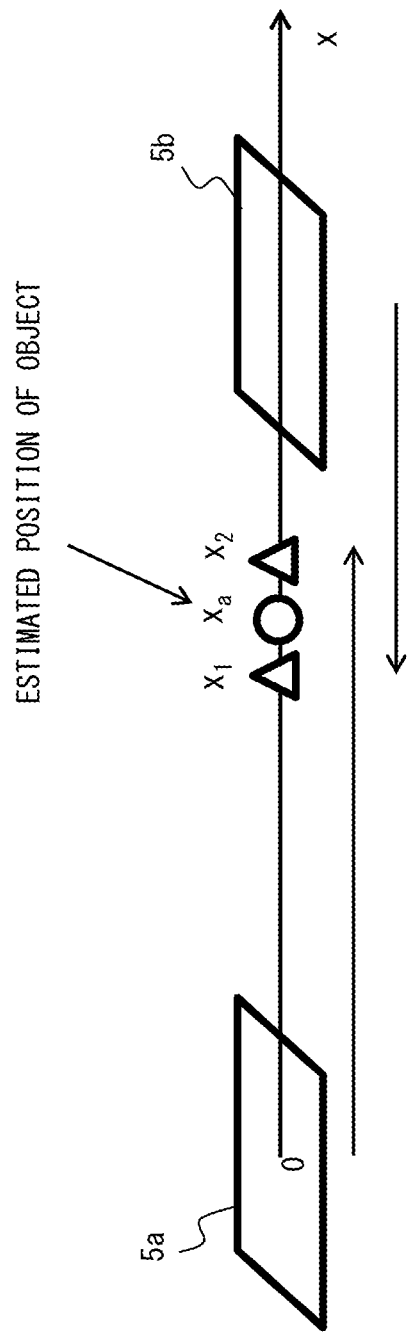
FIG. 17 is a diagram illustrating the object detection method according to the second exemplary embodiment.

FIG. 16 shows an object detection method (object detection process) that is performed in the object detection system according to this exemplary embodiment. The object detection method of FIG. 16 is described hereinafter using the example of FIG. 17. As shown in FIG. 17, the RFID tags 5a and 5b are placed side by side in the x-direction, and the object 2 exists in the area between the RFID tags 5a and 5b. It is assumed in this example that the object 2 is smaller than the gap between the RFID tags 5a and 5b.

First, in S200 to S203, the distance to the object is detected based on the signal strength from the plurality of RFID tags in the same manner as in S100 to S103 of FIG. 14 illustrating the first exemplary embodiment. Specifically, for detecting the distance, the setting unit 13 sets parameters of Expression (5) excluding the distance (S200).

Next, the input unit 12 acquires the signal strength of the RFID tags 5a and 5b (S201), and the input unit 12 calculates a variation in the signal strength of the RFID tags 5a and 5b (S202).

Further, the physical characteristics detection unit 14 detects the distances from the RFID tags 5a and 5b based on variations in the signal strength of the RFID tags 5a and 5b (S203). The physical characteristics detection unit 14 substitutes the parameters excluding the distance set in S200 and the variations in the signal strength of the RFID tags 5a and 5b into Expression (5) in the same manner as in the first exemplary embodiment and thereby detects the distances $x_1$ and $x_2$ from the RFID tags 5a and 5b to the object 2.

Then, the physical characteristics detection unit 14 detects the position of the object 2 based on the distances from the RFID tags 5a and 5b detected in S203 (S204). For example, it obtains an object estimation position $x_a$ by an average position or a weighted average position of the position (distance) $x_1$ estimated from the variation in signal strength of the RFID tag 5a and the position (distance) $x_2$ estimated from the variation in signal strength of the RFID tag 5b. When calculating the weighted average position, the average position is calculated by assigning weights to the position estimated from the RFID tag with a large variation in signal strength, which is considered to be more reliable.

Note that, although the position is detected as one example of the physical characteristics in this exemplary embodiment, the physical characteristics such as the height or the material other than the position may be extracted. Further, although one physical characteristic is detected from variations in signal strength of two the RFID tags, a plurality of physical characteristics may be detected from variations in signal strength of a plurality of RFID tags. For example, the height, in addition to the position on the horizon, may be calculated by solving simultaneous equations or performing multiple regression analysis based on variations in signal strength of a plurality of RFID tags.

As described above, in this exemplary embodiment, it is possible to accurately detect the physical characteristics of an object such as a position based on the signal strength of a plurality of RFID tags. For example, because the average or the like of a plurality of physical characteristics based on the signal strength of a plurality of RFID tags is used, the detection accuracy is improved compared with the case with one RFID tag. Because the physical characteristics are detected based on multivalued signal intensities just like in the first exemplary embodiment, it is possible to detect physical characteristics such as the position by a spatial resolution smaller than the gap between the RFID tags.

Third Exemplary Embodiment

A third exemplary embodiment is described hereinafter with reference to the drawings. In this exemplary embodiment, an example in which a plurality of RFID tags are placed one-dimensionally, which is different from the first and second exemplary embodiments, is described.

Figure 18:
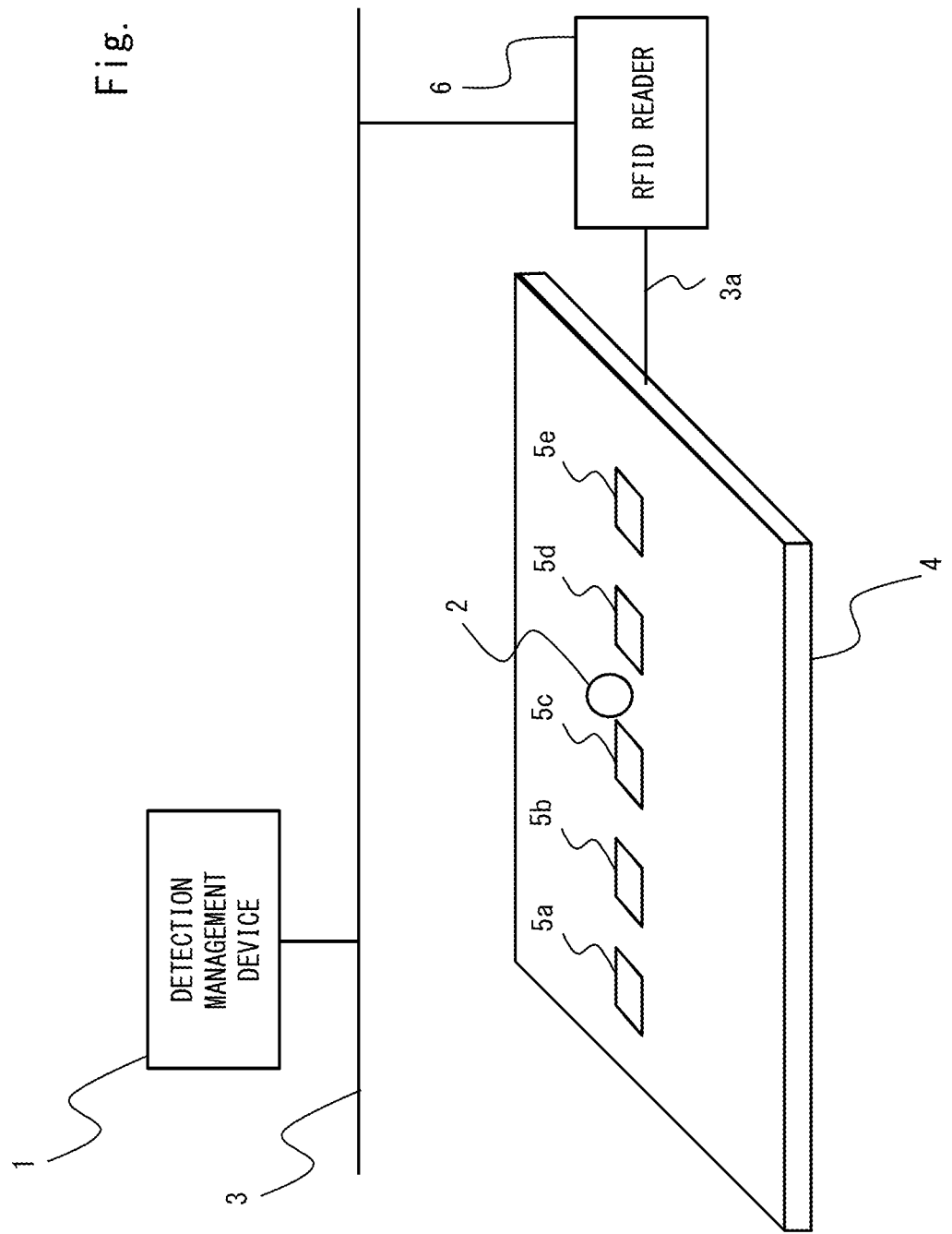
FIG. 18 is a schematic diagram showing the configuration of an object detection system according to a third exemplary embodiment.

FIG. 18 shows an example of the configuration of an object detection system according to this exemplary embodiment. As shown in FIG. 18, the object detection system according to this exemplary embodiment includes a detection management device 1, an RFID reader 6, a reader waveguide 4, and an RFID tag 5 as in the first and second exemplary embodiments. The configuration of the detection management device 1 is the same as that of FIG. 10 illustrating the first exemplary embodiment.

In this exemplary embodiment, five RFID tags 5a and 5e are placed as one example of a plurality of RFID tags. As shown in FIG. 18, the RFID tags 5a and 5e are arranged in a line (for example, in the x-direction) on the reader waveguide 4. The two adjacent RFID tags 5 are placed next to each other so that their detection ranges where the object 2 is detectable overlap, which is the same as in the second exemplary embodiment.

Figure 19:
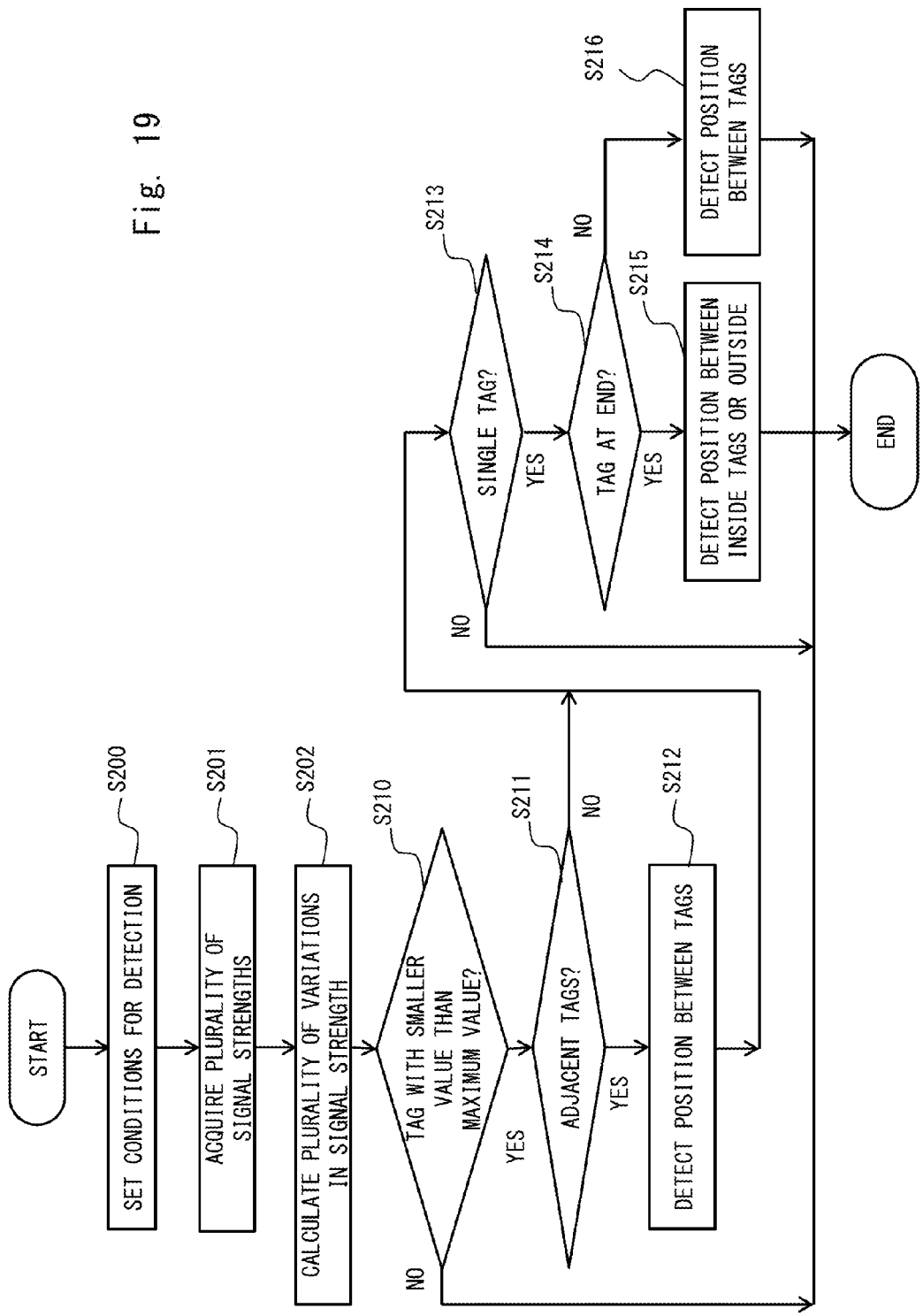
FIG. 19 is a flowchart showing an object detection method according to the third exemplary embodiment.

FIG. 19 shows an object detection method (object detection process) that is performed in the object detection system according to this exemplary embodiment.

First, just like in FIG. 16 illustrating the second exemplary embodiment, the setting unit 13 sets detection conditions for detecting a distance (S200), the input unit 12 acquires the signal strength of a plurality of RFID tags 5 (S201), and the input unit 12 calculates variations in signal strength of the plurality of RFID tags 5 (S202).

In this exemplary embodiment, three or more RFID tags 5 are placed and therefore it is necessary to specify the detection area of which RFID tag 5 the object 2 exists. Thus, in the following S210 to S216, an area in which the object 2 exists is determined by assumption, and the position of the object 2 in that area is detected.

Specifically, the physical characteristics detection unit 14 determines whether there is the RFID tag 5 where the value of a variation in signal strength is smaller than a predetermined maximum value (S210). In S210, when the values of variations in signal strength of all of the RFID tags 5 are larger than the maximum value, the physical characteristics detection unit 14 ends the process because the object 2 is not in the vicinity of the RFID tag 5.

In S210, when there is the RFID tag 5 where the value of a variation in signal strength is smaller than the maximum value in S210, the physical characteristics detection unit 14 determines whether there are RFID tags (a pair of RFID tags) adjacent to each other among the RFID tags 5 where the value of a variation in signal strength is smaller than the maximum value (S211).

In S211, when there is the RFID tags 5 in which the value of a variation in signal strength is smaller than the maximum value and which are adjacent to each other, the physical characteristics detection unit 14 detects the position of the object 2 in the area between those adjacent RFID tags 5 based on variations in signal strength (S212). Just like in S203 to S204 in the second exemplary embodiment, the distances from the adjacent RFID tags are detected based on variations in signal strength, and the position of the object 2 in the area between the RFID tags 5 is detected based on the detected two distances. When there are a plurality of pairs of the RFID tags 5 in which the value of a variation in signal strength is smaller than the maximum value and which are adjacent to each other, the physical characteristics detection unit 14 detects the position of the object 2 for each area between those pairs.

After S212, or when there is no RFID tags 5 in which the value of a variation in signal strength is smaller than the maximum value and which are adjacent to each other in S211, the physical characteristics detection unit 14 determines whether there is the RFID tag 5 (single RFID tag) in which the value of a variation in signal strength of the adjacent RFID tag 5 is larger than the maximum value among the RFID tags 5 where the value of a variation in signal strength is smaller than the maximum value (S213).

When there is no RFID tag 5 (single RFID tag) where the value of a variation in signal strength is smaller than the maximum value and where the value of a variation in signal strength of the adjacent RFID tag 5 is larger than the maximum value in S213, the physical characteristics detection unit 14 ends the process.

When there is the RFID tag 5 (single RFID tag) where the value of a variation in signal strength is smaller than the maximum value and where the value of a variation in signal strength of the adjacent RFID tag 5 is larger than the maximum value in S213, the physical characteristics detection unit 14 determines whether the corresponding RFID tag 5 is placed at the end of the line of RFID tags 5 (S214).

When, in S214, the single RFID tag 5 that is determined in S213 is placed at the end, the physical characteristics detection unit 14 detects the position of the object 2 in either one of areas at both ends of the corresponding RFID tag 5 based on a variation in signal strength (S215). Just like S203 in the second exemplary embodiment, the distance from the corresponding RFID tag 5 is detected based on a variation in signal strength, and the position of the object 2 is detected in either one of areas at both ends of the corresponding RFID tag 5. When there are a plurality of single RFID tags 5 that are placed at the end, the position of the object 2 is detected in the areas at both ends of each of the RFID tags 5.

When, in S214, the single RFID tag 5 that is determined in S213 is not placed at the end, the physical characteristics detection unit 14 detects the position of the object 2 in the area between the corresponding RFID tag 5 and any adjacent RFID tag 5 based on a variation in signal strength (S216). For example, the physical characteristics detection unit 14 selects the RFID tag 5 with a small value of a variation in signal strength among the RFID tags 5 adjacent to the corresponding RFID tag 5, and detects the position of the object 2 in the area between the corresponding RFID tag 5 and the selected RFID tag 5. Just like in S203 to S204 in the second exemplary embodiment, the distances from the selected adjacent RFID tags 5 are detected based on variations in the signal strength, and the position of the object 2 in the area between the selected RFID tags 5 is detected based on the detected two distances. When there are a plurality of single RFID tags 5 that are not placed at the end, the position of the object 2 is detected in the area between the each of the RFID tags 5 and the adjacent RFID tag 5.

A specific example of the object detection method shown in FIG. 19 is described hereinafter. In the following example, the operation after S210 in FIG. 19 is mainly described. As one example, the maximum value of a variation in signal strength determined in S210 is −1.0 dB.

Figure 20:
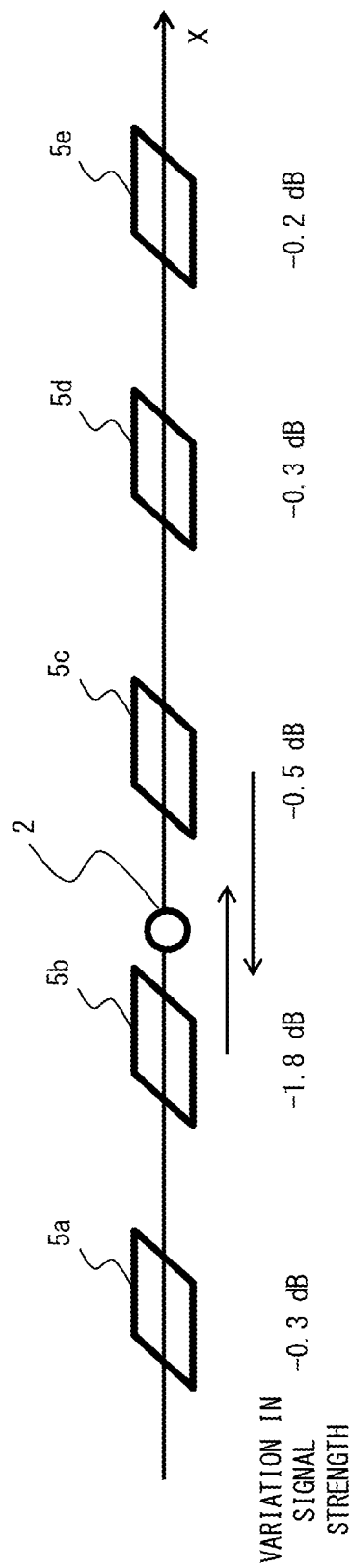
FIG. 20 is a diagram illustrating the object detection method according to the third exemplary embodiment.

FIG. 20 shows an example in which the object 2 exists between the RFID tags 5b and 5c. In this example, the value of a variation in signal strength of each RFID tag 5 is: −0.3 dB in the RFID tag 5a, −1.8 dB in the RFID tag 5b, −0.5 dB in the RFID tag 5c, −0.3 dB in the RFID tag 5d, and −0.2 dB in the RFID tag 5e.

In this case, the physical characteristics detection unit 14 determines that the value −1.8 dB of a variation in signal strength of the RFID tag 5b is smaller than the maximum value −1.0 dB (S210). Further, because the values of variations in signal strength of the tags other than the RFID tag 5b are larger than the maximum value −1.0 dB, it determines that there is no RFID tags 5 in which the value of a variation in signal strength is smaller than the maximum value and which are adjacent to each other (S211).

Further, because the values of variations in signal strength of the RFID tags 5a and 5c, which are adjacent on both sides to the RFID tag 5b, are larger than the maximum value, the physical characteristics detection unit 14 determines that the RFID tag 5b is the RFID tag (single the RFID tag) where the value of a variation in signal strength is smaller than the maximum value and the value of a variation in signal strength of the adjacent RFID tag 5 is larger than the maximum value (S213).

Further, because the RFID tag 5b is placed between the RFID tags 5a and 5c, the physical characteristics detection unit 14 determines that it is not a tag at the end of a line of RFID tags 5 (S214), and detects the position of the object 2 in the area between the corresponding RFID tag 5b and the adjacent RFID tags 5a or 5b based on variations in signal strength (S216).

In this case, the position is detected based on the assumption that the object 2 exists between the RFID tag 5c, which is the one with a smaller value of a variation in signal strength among the RFID tag 5a or 5b adjacent to the RFID tag 5b, and the RFID tag 5b.

Specifically, the distance from the RFID tag 5b to the object 2 is detected based on the value −1.8 dB of a variation in signal strength of the RFID tag 5b, the distance from the RFID tag 5c to the object 2 is detected based on the value −0.5 dB of a variation in signal strength of the RFID tag 5c, and the average or the like of the distances from the RFID tags 5b and 5c to the object 2 is calculated to thereby detect the position of the object 2 between the RFID tags 5b and 5c.

Figure 21:
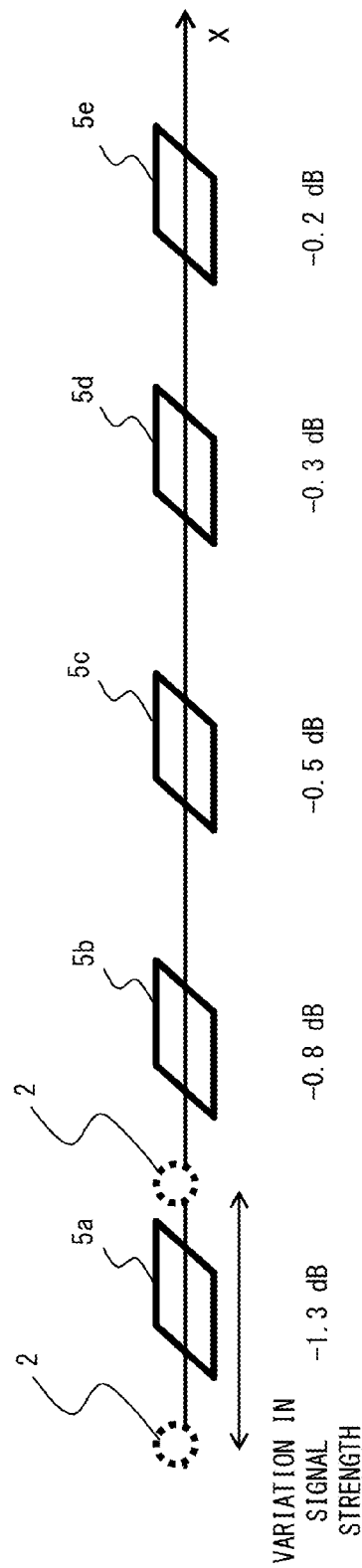
FIG. 21 is a diagram illustrating the object detection method according to the third exemplary embodiment.

FIG. 21 is an example in which the object 2 exists at either one of both ends of the RFID tag 5a. In this example, the value of a variation in signal strength of each RFID tag 5 is: −1.3 dB in the RFID tag 5a, −0.8 dB in the RFID tag 5b, −0.5 dB in the RFID tag 5c, −0.3 dB in the RFID tag 5d, and −0.2 dB in the RFID tag 5e.

In this case, the physical characteristics detection unit 14 determines that the value −1.3 dB of a variation in signal strength of the RFID tag 5a is smaller than the maximum value −1.0 dB (S210). Further, because the values of variations in signal strength of the tags other than the RFID tag 5a are larger than the maximum value −1.0 dB, it determines that there is no RFID tags 5 in which the value of a variation in signal strength is smaller than the maximum value and which are adjacent to each other (S211).

Further, because the value of a variation in signal strength of the RFID tags 5b, which is adjacent to the RFID tag 5a, is larger than the maximum value, the physical characteristics detection unit 14 determines that the RFID tag 5a is the RFID tag (single the RFID tag) where the value of a variation in signal strength is smaller than the maximum value and where the value of a variation in signal strength of the adjacent RFID tag 5 is larger than the maximum value (S213).

Further, because RFID tag 5 exists not on both sides of the RFID tag 5a, the physical characteristics detection unit 14 determines that it is a tag at the end of a line of RFID tags 5 (S214), and detects the position of the object 2 in either one of areas at both ends of the corresponding RFID tag 5a based on a variation in signal strength (S215).

In this case, it is assumed that the object 2 exists in any place that is apart by the distance estimated from a variation in signal strength of the RFID tag 5a (on the side of the adjacent RFID tag 5 or on the outer side with no RFID tag 5).

Specifically, the distance from the RFID tag 5a to the object 2 is detected based on the value −1.3 dB of a variation in signal strength of the RFID tag 5a, and the position of the object 2 in the area on the side close to the RFID tag 5b (on the inner side) from the RFID tag 5a or in the area opposite to the RFID tag 5b (on the outer side) from the RFID tag 5a is detected.

Figure 22:
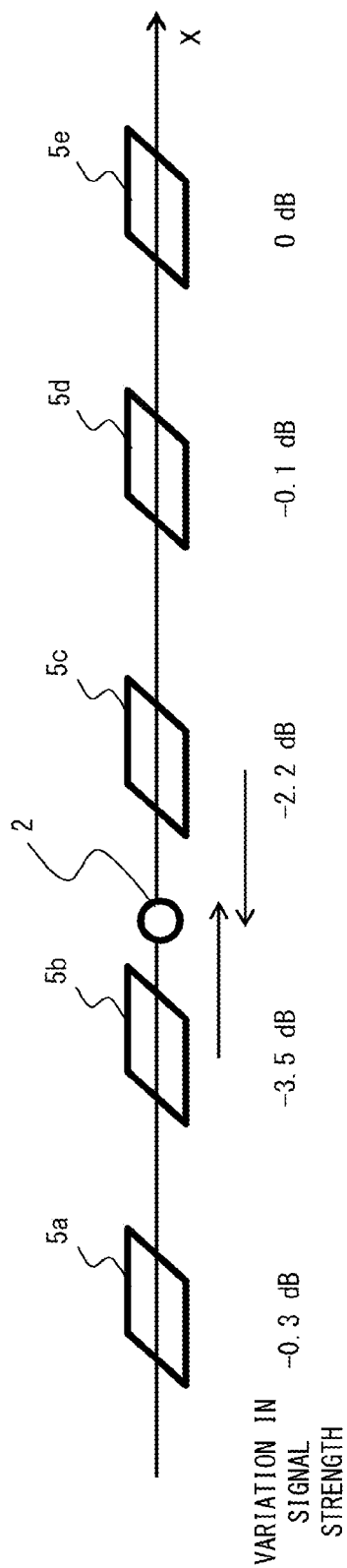
FIG. 22 is a diagram illustrating the object detection method according to the third exemplary embodiment.

FIG. 22 shows an example in which the object 2 exists between the RFID tags 5b and 5c. In this example, the value of a variation in signal strength of each RFID tag 5 is: −0.3 dB in the RFID tag 5a, −3.5 dB in the RFID tag 5b, −2.2 dB in the RFID tag 5c, −0.1 dB in the RFID tag 5d, and −0 dB in the RFID tag 5e.

In this case, the physical characteristics detection unit 14 determines that the value −3.5 dB of a variation in signal strength of the RFID tag 5b and the value −2.2 dB of a variation in signal strength of the RFID tag 5c are smaller than the maximum value −1.0 dB (S210). Further, the physical characteristics detection unit 14 determines that the values of variations in signal strength of the RFID tags 5b and 5c are smaller than the maximum value −1.0 dB and they are a pair of adjacent RFID tags 5 (S211).

In this case, because there are two RFID tags next to each other where the value of a variation in signal strength is smaller than the maximum value, the position is detected based on the assumption that the object 2 exists in the area between the adjacent RFID tags 5b and 5c (S212).

Specifically, the distance from the RFID tag 5b to the object 2 is detected based on the value −3.5 dB of a variation in signal strength of the RFID tag 5b, the distance from the RFID tag 5c to the object 2 is detected based on the value −2.2 dB of a variation in signal strength of the RFID tag 5c, and the average or the like of the distances from the RFID tags 5b and 5c to the object 2 is calculated to thereby detect the position of the object 2 between the RFID tags 5b and 5c.

Figure 23:
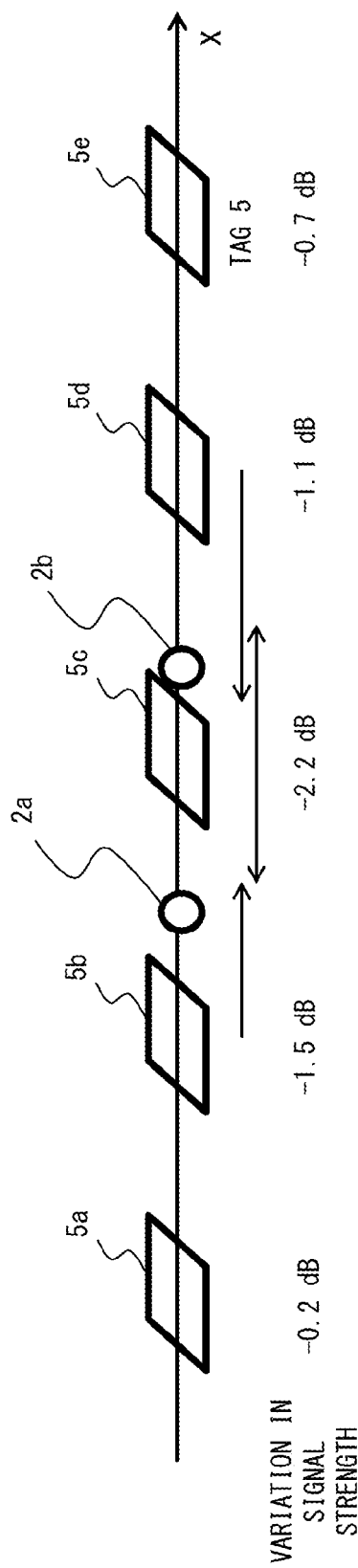
FIG. 23 is a diagram illustrating the object detection method according to the third exemplary embodiment.

FIG. 23 shows an example in which the object 2a exists between the RFID tags 5b and 5c and the object 2b exists between the RFID tags 5c and 5d. In this example, the value of a variation in signal strength of each RFID tag is: −0.2 dB in the RFID tag 5a, −1.5 dB in the RFID tag 5b, −2.2 dB in the RFID tag 5c, −1.1 dB in the RFID tag 5d, and −0.7 dB in the RFID tag 5e.

In this case, the physical characteristics detection unit 14 determines that the value −1.5 dB of a variation in signal strength of the RFID tag 5b, the value −2.2 dB of a variation in signal strength of the RFID tag 5c and the value −1.1 dB of a variation in signal strength of the RFID tag 5d are smaller than the maximum value −1.0 dB (S210). Further, the physical characteristics detection unit 14 determines that the values of variations in signal strength of the RFID tags 5b and 5c and the RFID tags 5c and 5d are smaller than the maximum value −1.0 dB and they are pairs of adjacent RFID tags (S211).

In this case, because there are three RFID tags next to one another where the value of a variation in signal strength is smaller than the maximum value, it is assumed that there are two objects. In this example, the position is detected based on the assumption that the objects 2a and 2b exist respectively in the area between the adjacent RFID tags 5b and 5c and the area between the adjacent RFID tags 5c and 5d (S212).

Specifically, the distance from the RFID tag 5b to the object 2a is detected based on the value −1.5 dB of a variation in signal strength of the RFID tag 5b, the distance from the RFID tag 5c to the object 2a is detected based on the value −2.2 dB of a variation in signal strength of the RFID tag 5c, and the average or the like of the distances from the RFID tags 5b and 5c to the object 2a is calculated to thereby detect the position of the object 2a between the RFID tags 5b and 5c.

Likewise, the distance from the RFID tag 5c to the object 2b is detected based on the value −2.2 dB of a variation in signal strength of the RFID tag 5c, the distance from the RFID tag 5d to the object 2b is detected based on the value −1.1 dB of a variation in signal strength of the RFID tag 5d, and the average or the like of the distances from the RFID tags 5c and 5d to the object 2b is calculated to thereby detect the position of the object 2b between the RFID tags 5c and 5d.

In the case of FIG. 23, the value of a variation in signal strength of the RFID tag 5c is a value according to the objects 2a and 2b. Thus, when calculating the distance from the RFID tag 5c to the object 2a and the distance from the RFID tag 5c to the object 2b, weights may be assigned according to the values of variations in signal strength of the adjacent RFID tags 5b and 5d. For example, because the value of a variation in signal strength of the RFID tag 5b is smaller than that of the RFID tag 5d, weights may be assigned to increase the distance from the RFID tag 5c to the object 2a on the RFID tag 5b side, weights may be assigned to reduce the distance from the RFID tag 5c to the object 2b on the RFID tag 5d side.

Figure 24:
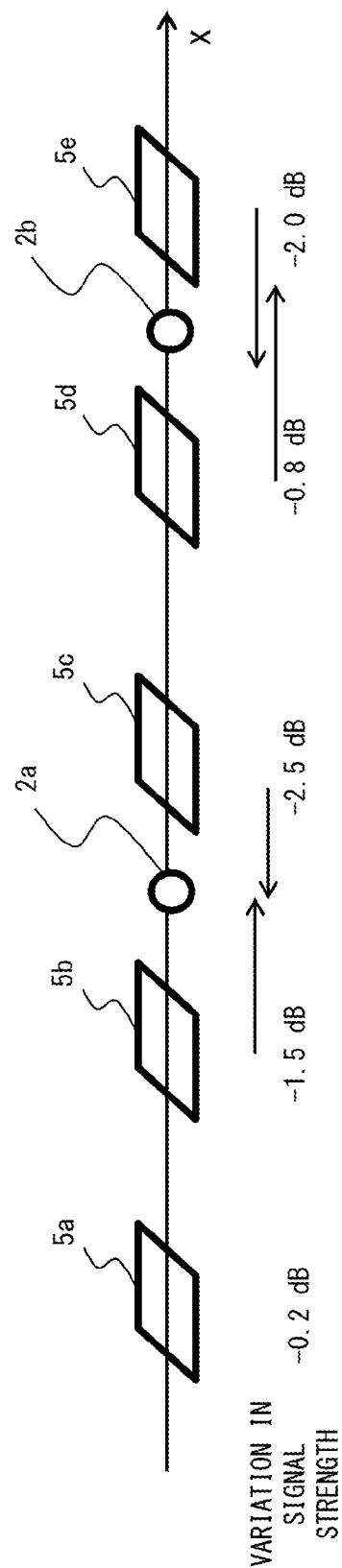
FIG. 24 is a diagram illustrating the object detection method according to the third exemplary embodiment.

FIG. 24 shows an example in which the object 2a exists between the RFID tags 5b and 5c, and the object 2b exists between the RFID tags 5d and 5e. In FIG. 24, the value of a variation in signal strength of each RFID tag 5 is: −0.2 dB in the RFID tag 5a, −1.5 dB in the RFID tag 5b, −2.5 dB in the RFID tag 5c, −0.8 dB in the RFID tag 5d, and −2.0 dB in the RFID tag 5e.

In this case, the physical characteristics detection unit 14 determines that the value −1.5 dB of a variation in signal strength of the RFID tag 5b, the value −2.5 dB of a variation in signal strength of the RFID tag 5c and the value −2.0 dB of a variation in signal strength of the RFID tag 5e are smaller than the maximum value −1.0 dB (S210). Further, the physical characteristics detection unit 14 determines that the values of variations in signal strength of the RFID tags 5b and 5c are smaller than the maximum value −1.0 dB and they are a pair of adjacent RFID tags (S211).

Further, because the value of a variation in signal strength of the RFID tag 5d, which is adjacent to the RFID tag 5e, is larger than the maximum value, the physical characteristics detection unit 14 determines that the RFID tag 5e is the RFID tag (single the RFID tag) where the value of a variation in signal strength is smaller than the maximum value and the value of a variation in signal strength of the adjacent RFID tag 5 is larger than the maximum value (S213). Further, because RFID tag 5 exists not on both sides of the RFID tag 5e, the physical characteristics detection unit 14 determines that it is a tag at the end of a line of RFID tags 5 (S214).

In this case, because there are three or more RFID tags that are not next to one another where the value of a variation in signal strength is smaller than the maximum value, it is assumed that there are a plurality of objects 2. In this example, the position is detected based on the assumption that the objects 2a and 2b exist respectively in the area between the RFID tags 5b and 5c and the area between the RFID tags 5d and 5e (S212, S215).

Specifically, the distance from the RFID tag 5b to the object 2a is detected based on the value −1.5 dB of a variation in signal strength of the RFID tag 5b, the distance from the RFID tag 5c to the object 2a is detected based on the value 2.5 dB of a variation in signal strength of the RFID tag 5c, and the average or the like of the distances from the RFID tags 5b and 5c to the object 2a is calculated to thereby detect the position of the object 2a between the RFID tags 5b and 5c.

Likewise, the distance from the RFID tag 5d to the object 2b is detected based on the value −0.8 dB of a variation in signal strength of the RFID tag 5d, the distance from the RFID tag 5e to the object 2b is detected based on the value 2.0 dB of a variation in signal strength of the RFID tag 5e, and the average or the like of the distances from the RFID tags 5d and 5e to the object 2b is calculated to thereby detect the position of the object 2b between the RFID tags 5d and 5e.

Figure 25:
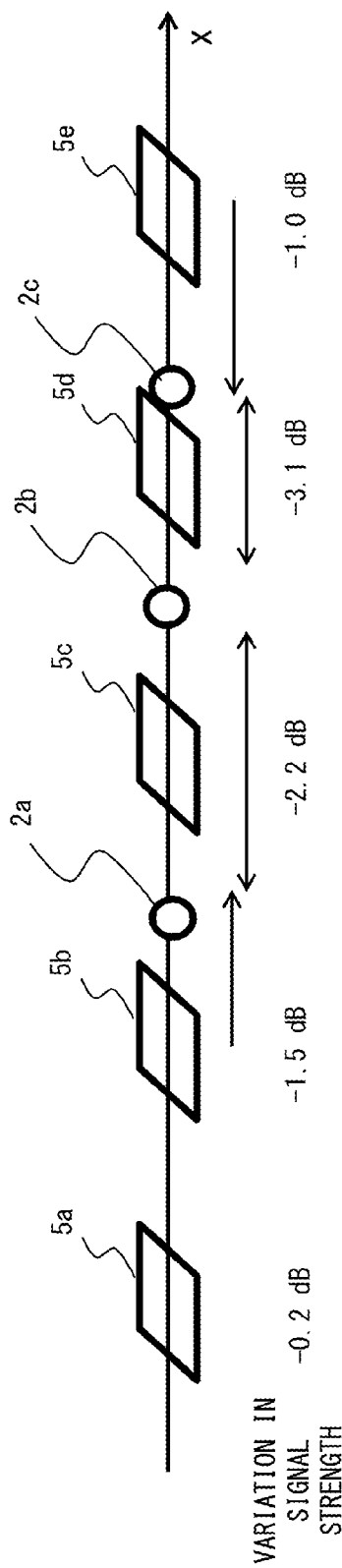
FIG. 25 is a diagram illustrating the object detection method according to the third exemplary embodiment.

FIG. 25 shows an example in which the object 2a exists between the RFID tags 5b and 5c, the object 2b exists between the RFID tags 5c and 5d, and the object 2c exists between the RFID tags 5d and 5e. In this example, the value of a variation in signal strength of each RFID tag 5 is: −0.2 dB in the RFID tag 5a, −1.5 dB in the RFID tag 5b, −2.2 dB in the RFID tag 5c, −3.1 dB in the RFID tag 5d, and −1.0 dB in the RFID tag 5e.

In this case, the physical characteristics detection unit 14 determines that the value −1.5 dB of a variation in signal strength of the RFID tag 5b, the value −2.2 dB of a variation in signal strength of the RFID tag 5c, the value −3.1 dB of a variation in signal strength of the RFID tag 5d and the value −1.0 dB of a variation in signal strength of the RFID tag 5e are smaller than the maximum value −1.0 dB (S210). Further, the physical characteristics detection unit 14 determines that the values of variations in signal strength of the RFID tags 5b and 5c, the RFID tags 5c and 5d and the RFID tags 5d and 5e are smaller than the maximum value −1.0 dB and they are pairs of adjacent RFID tags 5 (S211).

In this case, because there are four RFID tags that are next to one another where the value of a variation in signal strength is smaller than the maximum value, it is assumed that there are two or more objects. In this example, the position is detected based on the assumption that the objects 2a, 2b and 2c exist respectively in the area between the RFID tags 5b and 5c, the area between the RFID tags 5c and 5d, and the area between the RFID tags 5d and 5e (S212).

Specifically, the distances from the RFID tags 5b and 5c to the object 2a are detected based on the value −1.5 dB of a variation in signal strength of the RFID tag 5b and the value −2.2 dB of a variation in signal strength of the RFID tag 5c, and the position of the object 2a between the RFID tags 5b and 5c is thereby detected based on those distances. Further, the distances from the RFID tags 5c and 5d to the object 2b are detected based on the value −2.2 dB of a variation in signal strength of the RFID tag 5c and the value −3.1 dB of a variation in signal strength of the RFID tag 5d, and the position of the object 2b between the RFID tags 5c and 5d is thereby detected based on those distances. Furthermore, the distances from the RFID tags 5d and 5e to the object 2c are detected based on the value −3.1 dB of a variation in signal strength of the RFID tag 5d and the value −1.0 dB of a variation in signal strength of the RFID tag 5e, and the position of the object 2c between the RFID tags 5d and 5e is thereby detected based on those distances.

Figure 26:
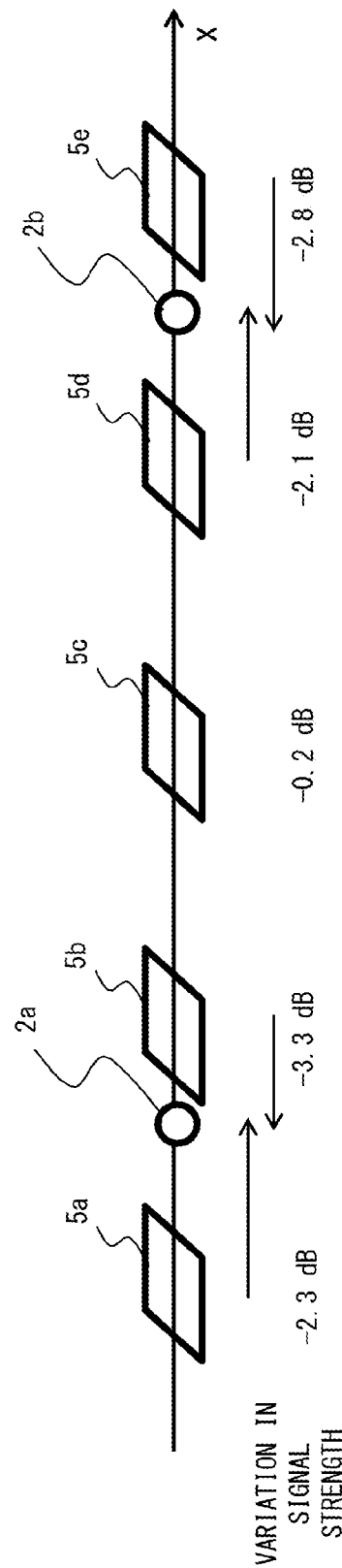
FIG. 26 is a diagram illustrating the object detection method according to the third exemplary embodiment.

FIG. 26 shows an example in which the object 2a exists between the RFID tags 5a and 5b and the object 2b exists between the RFID tags 5d and 5e. In this example, the value of a variation in signal strength of each RFID tag 5 is: −2.3 dB in the RFID tag 5a, −3.3 dB in the RFID tag 5b, −0.2 dB in the RFID tag 5c, −2.1 dB in the RFID tag 5d, and −2.8 dB in the RFID tag 5e.

In this case, the physical characteristics detection unit 14 determines that the value −2.3 dB of a variation in signal strength of the RFID tag 5a, the value −3.3 dB of a variation in signal strength of the RFID tag 5b, the value −2.1 dB of a variation in signal strength of the RFID tag 5d, and the value −2.8 dB of a variation in signal strength of the RFID tag 5e are smaller than the maximum value −1.0 dB (S210).

Further, the physical characteristics detection unit 14 determines that the values of variations in signal strength of the RFID tags 5a and 5b and the RFID tags 5d and 5e are smaller than the maximum value −1.0 dB and they are pairs of adjacent RFID tags 5 (S211).

In this case, because there are two pairs of RFID tags in which the value of a variation in signal strength is smaller than the maximum value and which are adjacent to each other, it is assumed that there are two objects. In this example, the position is detected based on the assumption that the objects 2a and 2b exist respectively in the area between the adjacent RFID tags 5a and 5b and the area between the adjacent RFID tags 5d and 5e (S212).

Specifically, just like FIG. 23, the distances from the RFID tags 5a and 5b to the object 2a are detected based on the value −2.3 dB of a variation in signal strength of the RFID tag 5a and the value −3.3 dB of a variation in signal strength of the RFID tag 5b, and the position of the object 2a between the RFID tags 5a and 5b is detected based on those distances. Further, the distances from the RFID tags 5d and 5e to the object 2b are detected based on the value −2.1 dB of a variation in signal strength of the RFID tag 5d and the value −2.8 dB of a variation in signal strength of the RFID tag 5e, and the position of the object 2b between the RFID tags 5d and 5e is detected based on those distances.

As described above, in this exemplary embodiment, a plurality of RFID tags are arranged in a line, and the physical characteristics of an object such as a position are detected based on the signal strength of the plurality of RFID tags, in addition to the second exemplary embodiment. Because it is possible to estimate in the vicinity of which RFID tag an object exists, and it is thus possible to detect the physical characteristics more accurately.

Fourth Exemplary Embodiment

A fourth exemplary embodiment is described hereinafter with reference to the drawings. In this exemplary embodiment, an example in which a plurality of RFID tags are placed two-dimensionally, which is different from the first and second exemplary embodiments, is described.

Figure 27:
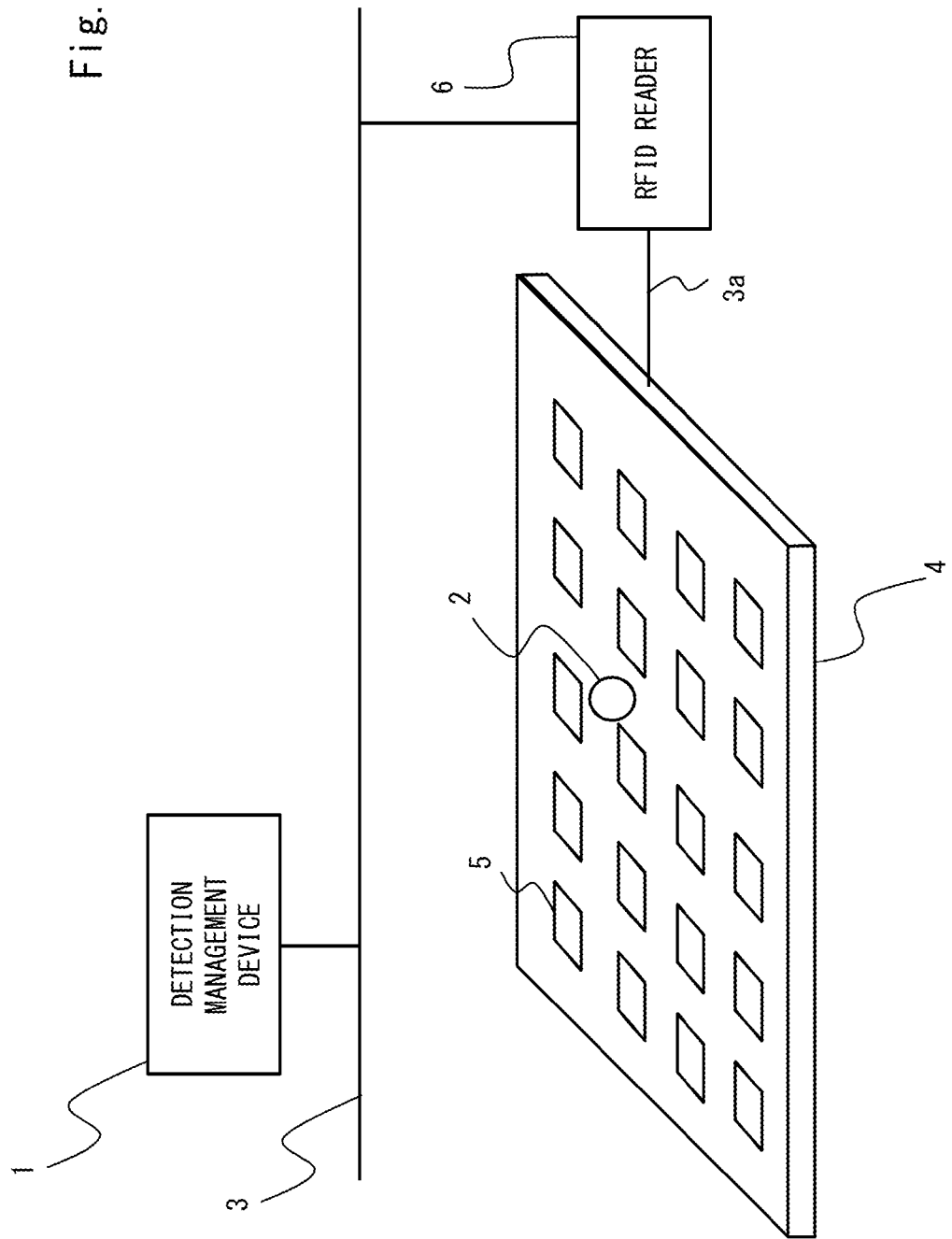
FIG. 27 is a schematic diagram showing the configuration of an object detection system according to a fourth exemplary embodiment.

FIG. 27 shows an example of the configuration of an object detection system according to this exemplary embodiment. As shown in FIG. 27, the object detection system according to this exemplary embodiment includes a detection management device 1, an RFID reader 6, a reader waveguide 4, and an RFID tag 5 just like in the first to third exemplary embodiments. The configuration of the detection management device 1 is the same as that of FIG. 10 illustrating the first exemplary embodiment.

In this exemplary embodiment, a plurality of RFID tags are arrayed in matrix (for example, in the x-direction and the y-direction) on the reader waveguide 4. Just like the second and third exemplary embodiments, the RFID tags 5 that are adjacent in the x-direction and the y-direction are arranged next to each other so that their detection ranges where the object 2 is detectable overlap.

The object detection method (object detection process) that is performed in the object detection system according to this exemplary embodiment is the same as that of the second exemplary embodiment shown in FIG. 16. Specifically, just like the second exemplary embodiment, the distances from the plurality of RFID tags 5 to the object 2 are detected based on a plurality of amounts of change in signal strength, and the position of the object 2 is detected based on the plurality of detected distances. In this embodiment, because the RFID tags 5 are arranged two-dimensionally, the position of the object 2 on two-dimensional coordinates is detected based on the distances from the three or more RFID tags 5 in the vicinity of the object 2.

The object detection method according to this exemplary embodiment is described hereinafter using a specific example of FIG. 28. Although the two-dimensional position of the object 2 is detected using four RFID tags 5 in this example, the two-dimensional position of the object 2 may be detected using three RFID tags 5.

Figure 28:
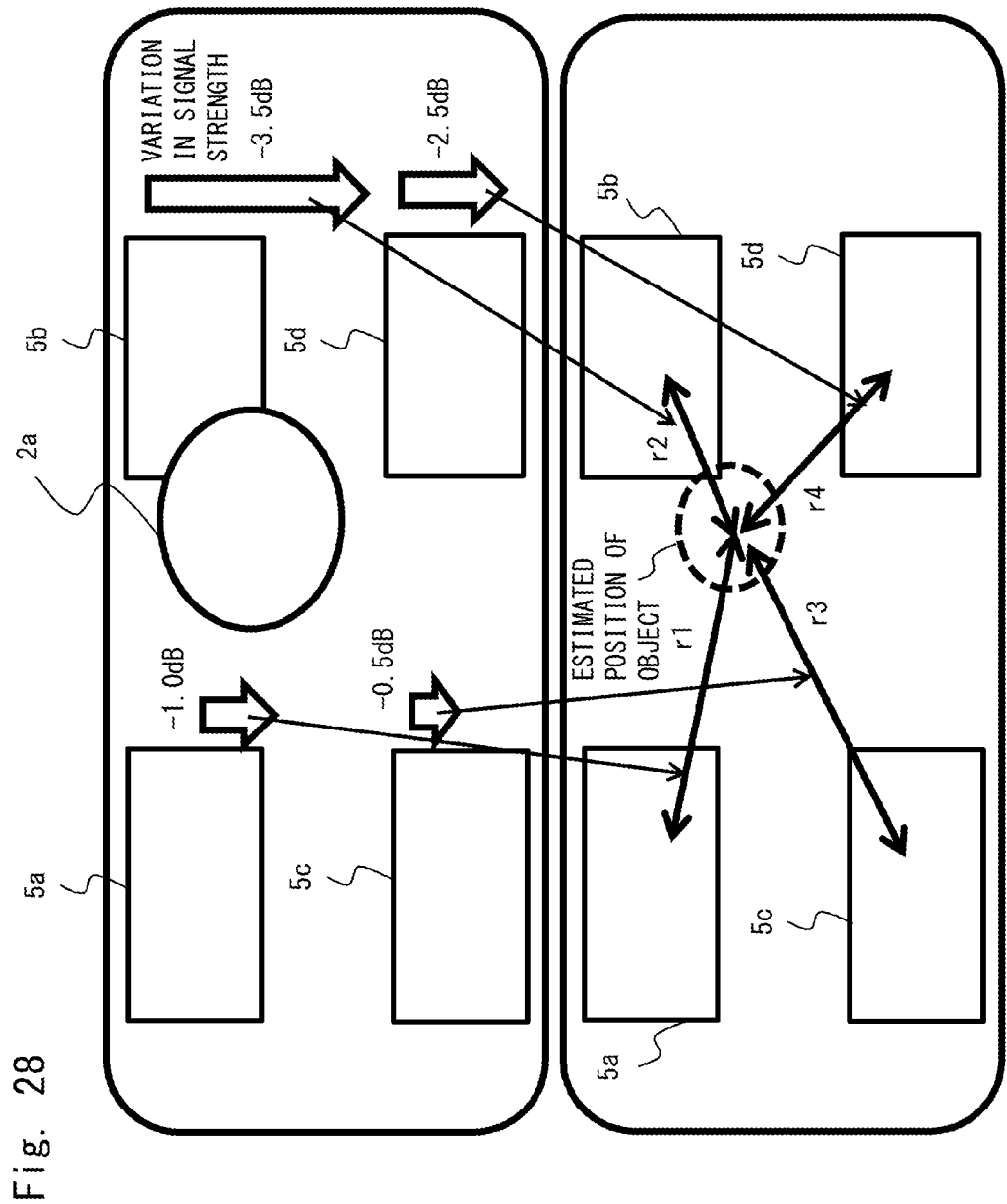
FIG. 28 is a diagram illustrating an object detection method according to the fourth exemplary embodiment.

As shown in FIG. 28, the RFID tags 5a and 5d are arrayed in matrix, and the object 2 exists in the area between the RFID tags 5a and 5d. In this example, it is assumed that the object 2 is smaller than the gap between the RFID tags 5a and 5d.

In FIG. 28, the position of the object 2 is estimated based on a position (distance) r1 that is estimated from a variation in signal strength of the RFID tag 5a, a position (distance) r2 that is estimated from a variation in signal strength of the RFID tag 5b, a position (distance) r3 that is estimated from a variation in signal strength of the RFID tag 5c, and a position (distance) r4 that is estimated from a variation in signal strength of the RFID tag 5d. For example, the position of the object 2 may be estimated by calculating an average position or a weighted average position.

Specifically, the distance r1 from the RFID tag 5a to the object 2 is detected based on the value −1.0 dB of a variation in signal strength of the RFID tag 5a, the distance r2 from the RFID tag 5b to the object 2 is detected based on the value −3.5 dB of a variation in signal strength of the RFID tag 5b, the distance r3 from the RFID tag 5c to the object 2 is detected based on the value −0.5 dB of a variation in signal strength of the RFID tag 5c, the distance r4 from the RFID tag 5d to the object 2 is detected based on the value −2.5 dB of a variation in signal strength of the RFID tag 5d. For example, it is assumed that a position (area) at which the points distant from the RFID tags 5a and 5d by the distances r1 to r4 overlap is the position (area) of the object 2. Note that, in consideration of the fact that the horizontal parameter P3 of a variation in signal strength is a function of not only the distance r but also the azimuth $\phi$ as shown in Expression (5), the position can be estimated more accurately.

As described above, in this exemplary embodiment, the physical characteristics of an object such as a position are detected based on the signal strength of a larger number of RFID tags than those in the second or third exemplary embodiment. For example, the position on a plane surface of the object can be detected accurately from a variation in signal strength from three or more RFID tags that cover the plane surface.

Note that, physical characteristics such as a height or a material, not limited to a position, may be extracted just like in the second exemplary embodiment. Further, when placing four or more RFID tags, the position of the object in a three-dimensional space can be obtained more accurately particularly if a variation in signal strength from the tags different from on the plane surface is obtained.

Fifth Exemplary Embodiment

A fifth exemplary embodiment is described hereinafter with reference to the drawings. In this exemplary embodiment, an example in which a plurality of RFID tags are placed two-dimensionally to detect a shape of an object as in the fourth exemplary embodiment is described. The configuration of the object detection system according to this exemplary embodiment is the same as that of FIG. 27 illustrating the fourth exemplary embodiment, and the configuration of the detection management device 1 according to this exemplary embodiment is the same as that of FIG. 10 illustrating the first exemplary embodiment.

Figure 29:
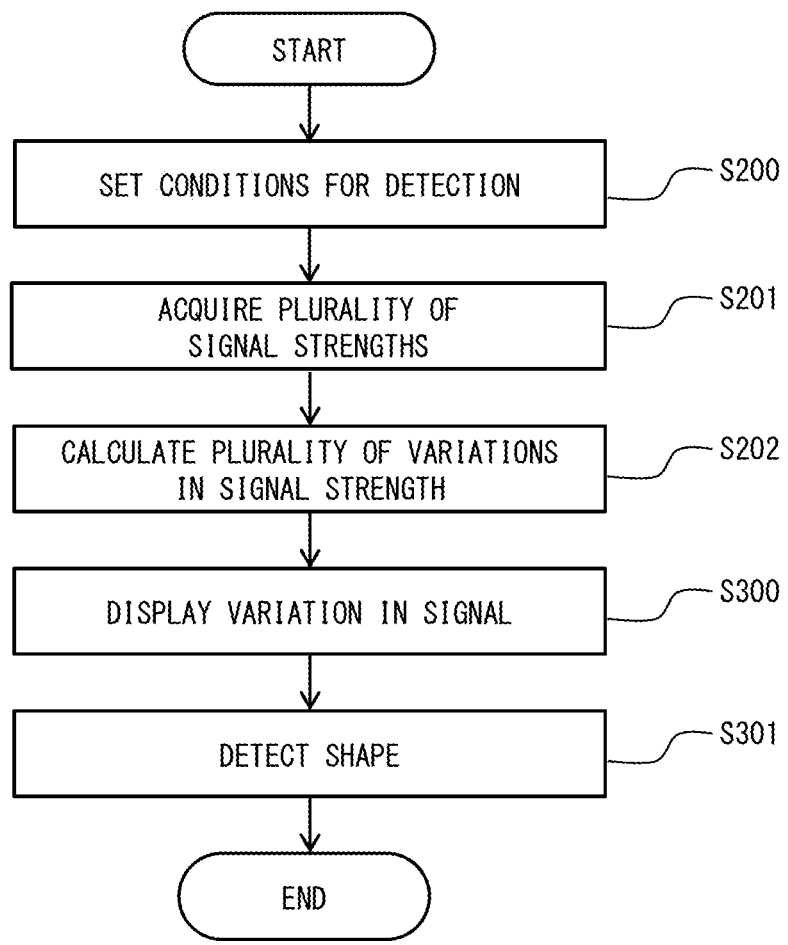
FIG. 29 is a flowchart showing an object detection method according to a fifth exemplary embodiment.

FIG. 29 shows an object detection method (object detection process) that is performed in the object detection system according to this exemplary embodiment.

First, just like in FIG. 16 illustrating the second exemplary embodiment, the setting unit 13 sets detection conditions for detecting a distance (S200), the input unit 12 acquires the signal strength of the plurality of RFID tags 5 (S201), and the input unit 12 calculates a variation in signal strength of the plurality of RFID tags 5 (S202).

Figure 30:
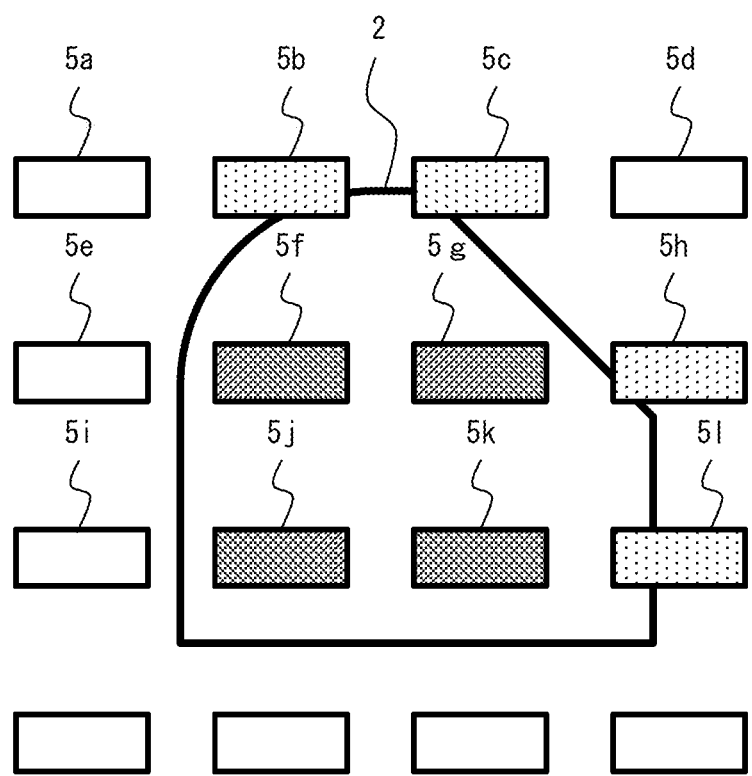
FIG. 30 is a diagram illustrating the object detection method according to the fifth exemplary embodiment.

After that, the display unit 15 displays the variation in signal strength calculated in S202 (S300). FIG. 30 shows an example of display of the RFID tags on the display unit 15 according to a variation in signal strength, and the RFID tags 5a and 5l are arrayed in matrix to detect the shape of the object 2.

Figure 31:
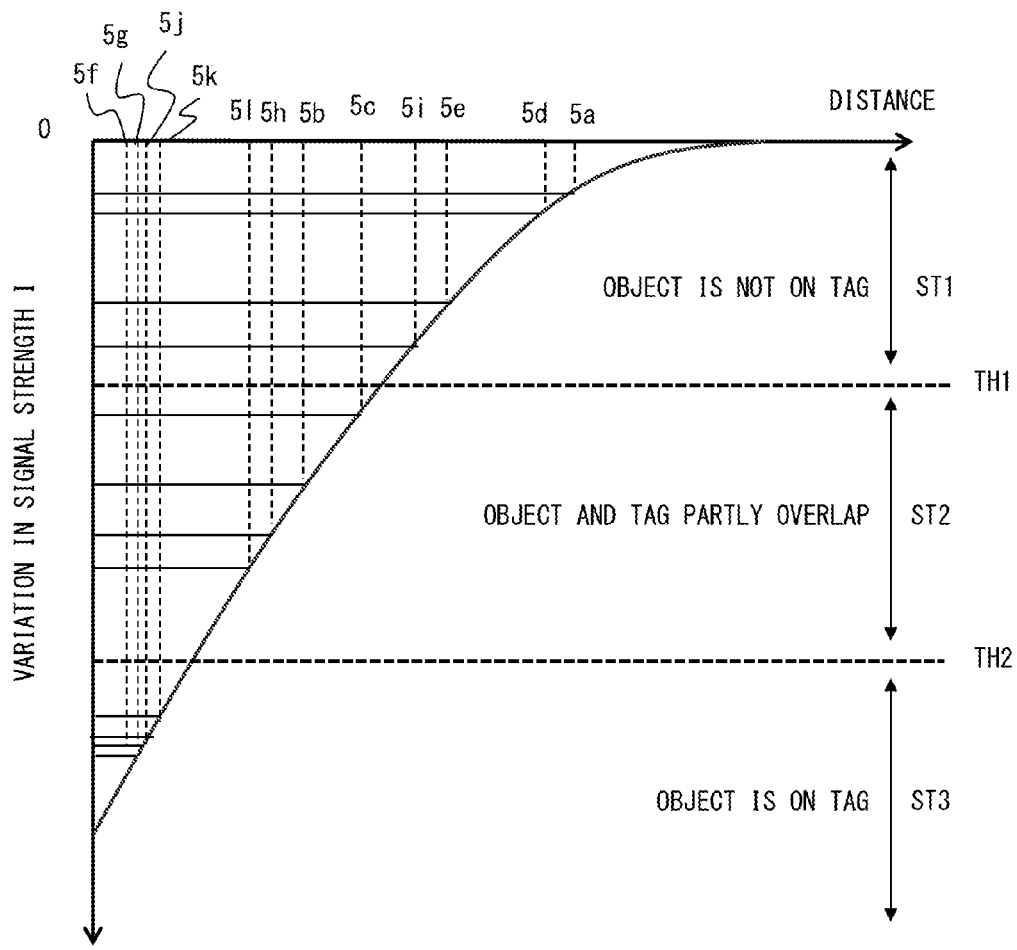
FIG. 31 is a diagram illustrating the object detection method according to the fifth exemplary embodiment.

FIG. 31 shows variations in signal strength of the RFID tags 5a and 5l of FIG. 30. In this example, a variation in signal strength is sorted into three levels of detection states using two thresholds as shown in FIG. 31. The detection state is an overlap state indicating to what degree the object 2 is placed overlapping on the RFID tag 5. The state where the value of a variation in signal strength is between 0 and a threshold TH1 is a detection state ST1 where the object 2 is not placed overlapping on the RFID tag 5, the state where the value of a variation in signal strength is between the threshold TH1 and a threshold TH2 is a detection state ST2 where the object 2 partly overlap with the RFID tag 5, and the state where the value of a variation in signal strength is equal to or more than the threshold TH2 is a detection state ST3 where the object 2 is placed overlapping on the RFID tag 5. Variations in signal strength of the RFID tags 5a, 5d, 5e and 5i are values corresponding to the detection state ST1, variations in signal strength of the RFID tags 5c, 5b, 5h and 5l are values corresponding to the detection state ST2, and variations in signal strength of the RFID tags 5k, 5j, 5g and 5f are values corresponding to the detection state ST3.

As shown in FIG. 30, the display unit 15 performs display according to the detection states ST1 to ST3 of FIG. 31. For example, the display unit 15 displays the color corresponding to the detection state of the RFID tag 5 at the positions in accordance with the two-dimensional array of the RFID tags 5. In FIG. 30, the RFID tags 5a, 5d, 5e and 5i in the detection state ST1 are represented by white, the RFID tags 5c, 5b, 5h and 5l in the detection state ST2 are represented by a pale hatch pattern, and the RFID tags 5k, 5j, 5g and 5f in the detection state ST3 are represented by a dark hatch pattern.

Then, the physical characteristics detection unit 14 recognizes (detects) the shape of the object 2 based on the calculated and displayed variation in signal strength (S301). The physical characteristics detection unit 14 detects the shape of the object 2 according to the detection state displayed as in FIG. 30. Specifically, in this exemplary embodiment, the physical characteristics detection unit 14 determines the overlap state (detection state) of the object 2 according to variations in signal strength of the RFID tags 5, and detects the shape of the object 2 based on the determined overlap state. For example, the physical characteristics detection unit 14 specifies the area that includes all of the RFID tags 5 in the detection state ST3 and includes some of the RFID tags 5 in the detection state ST2, and recognizes the outline of the specified area as the shape of the object 2. Stated differently, the physical characteristics detection unit 14 detects the outline of the object 2. Note that the shape of the object 2 may be detected according to the detection state (variation in signal strength) of FIG. 31 without display on the display unit 15.

As described above, in this exemplary embodiment, the shape of the object is detected based on variations in signal strength of a plurality of RFID tags. Because the shape of the object is detected based on the relationship between multi-valued (three or more values of) signal strength and physical characteristics as in FIG. 31, it is possible to improve the detection accuracy.

Sixth Exemplary Embodiment

A sixth exemplary embodiment is described hereinafter with reference to the drawings. In this exemplary embodiment, an example of detecting the shape of an object by using an isoline, which is different from the fifth exemplary embodiment, is described. The configuration of the object detection system according to this exemplary embodiment is the same as that of FIG. 27 illustrating the fourth exemplary embodiment.

Figure 32:
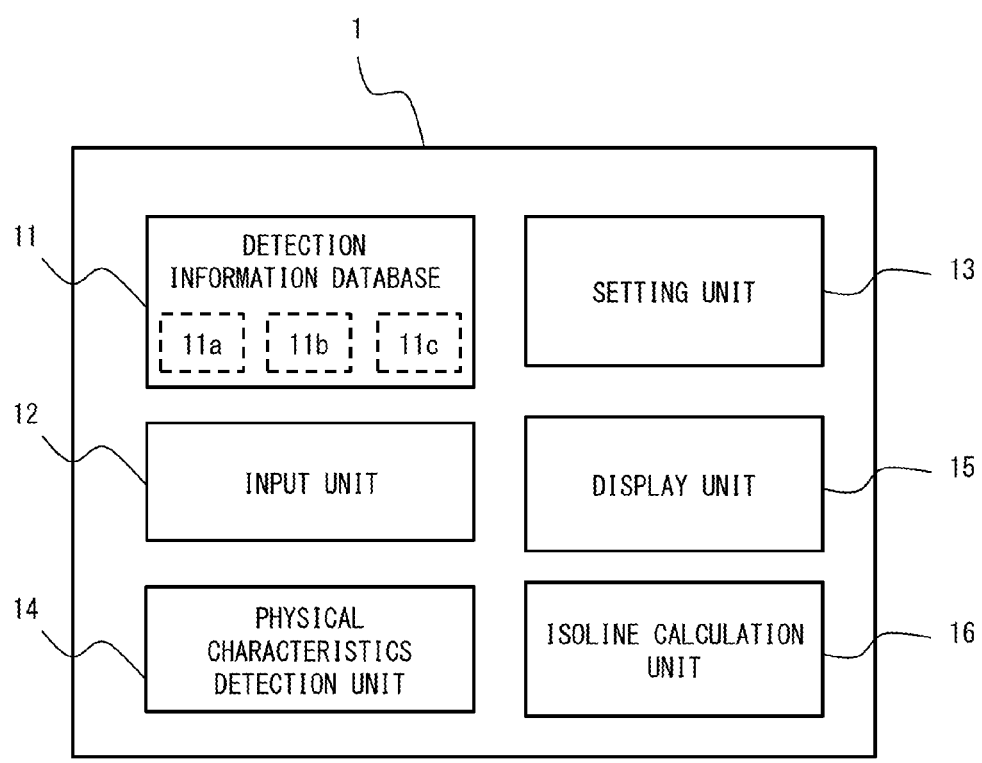
FIG. 32 is a block diagram showing the configuration of a detection management device according to a sixth exemplary embodiment.

FIG. 32 shows the configuration of the detection management device 1 according to this exemplary embodiment.

As shown in FIG. 32, the detection management device 1 includes an isoline calculation unit 16 in addition to the elements of the first exemplary embodiment shown in FIG. 10. The isoline calculation unit 16 calculates an isoline based on a variation in signal strength of the RFID tag 5 calculated by the input unit 12.

Figure 33:
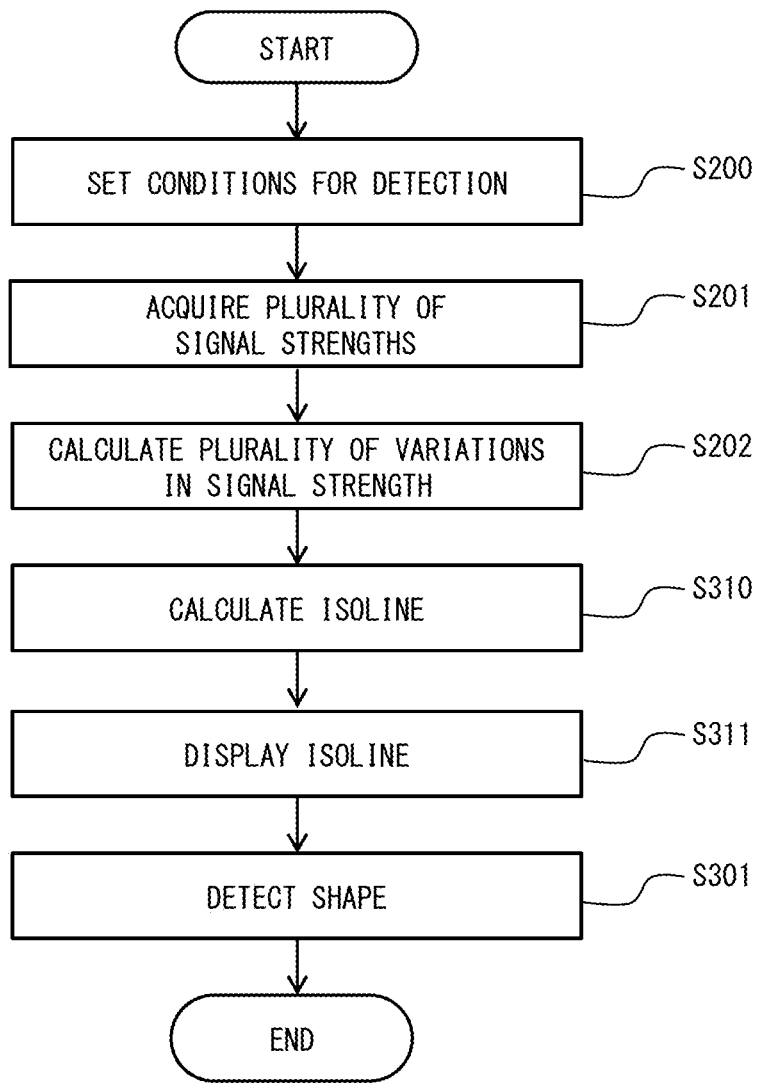
FIG. 33 is a diagram illustrating an object detection method according to the sixth exemplary embodiment.

FIG. 33 shows an object detection method (object detection process) that is performed in the object detection system according to this exemplary embodiment.

First, just like FIG. 29 illustrating the fifth exemplary embodiment, the setting unit 13 sets necessary detection conditions (S200), the input unit 12 acquires the signal strength of a plurality of RFID tags 5 (S201), and the input unit 12 calculates a plurality of variations in signal strength (S202).

Figure 34:
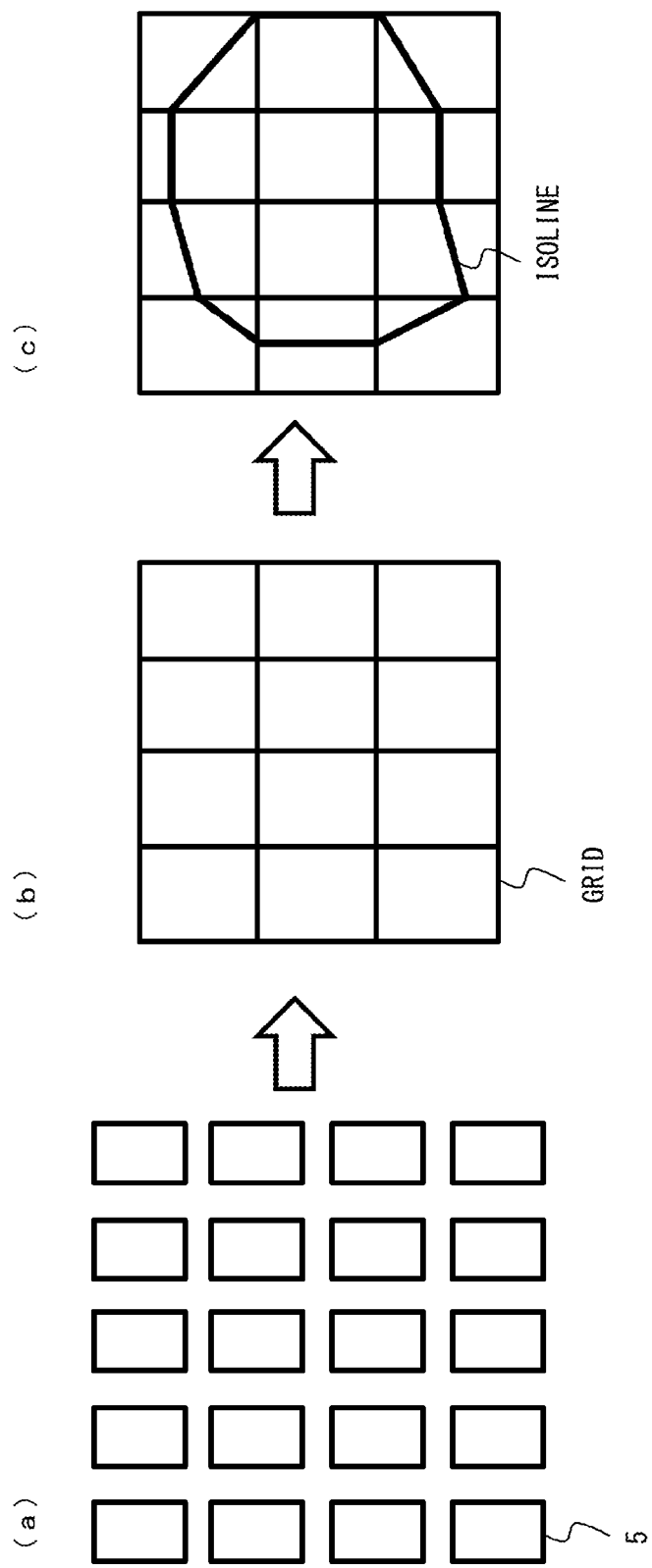
FIG. 34 is a diagram illustrating an isoline calculation method according to the sixth exemplary embodiment.

Then, the isoline calculation unit 16 calculates an isoline based on the variation in signal strength calculated in S202 (S310). The isoline calculation unit 16 acquires variations in signal strength of the RFID tags 5 arrayed in matrix as shown in FIG. 34(a). Then, as shown in FIG. 34(b) the isoline calculation unit 16 associates a grid corresponding to the array of the RFID tags 5 with the variations in signal strength of the RFID tags 5, and sets the acquired variations in signal strength respectively at lattice points of the grid. After that, as shown in FIG. 34(c), it interpolates the value of variation in signal strength based on the variations in signal strength at the lattice points of the grid and thereby obtains an isoline. It is preferred to set a higher value to the value H of variation in signal strength in the isoline compared with the stationary noise of variation in signal strength. The value H of variation in signal strength for calculating the isoline may be one or two or more. Note that the grid is not limited to a x-y rectangular coordinate system using a distance x in the x-direction and a distance y in the y-direction, and a polar coordinate system using a distance r' from the origin and an angle (p' (azimuth) from the x-axis may be used.

Figure 35:
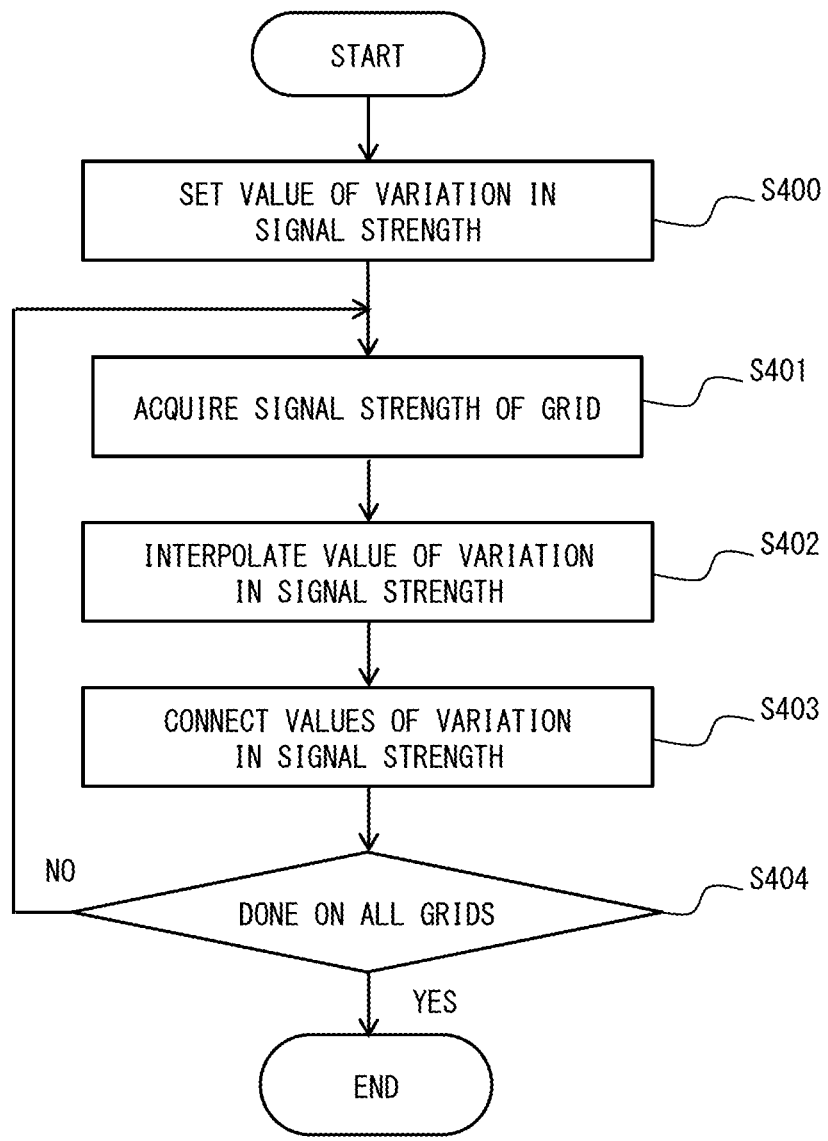
FIG. 35 is a diagram illustrating the isoline calculation method according to the sixth exemplary embodiment.

FIG. 35 shows one example of the isoline calculation processing in S310. As shown in FIG. 35, the isoline calculation unit 16 specifies the value H of variation in signal strength to draw an isoline (S400).

Figure 36:
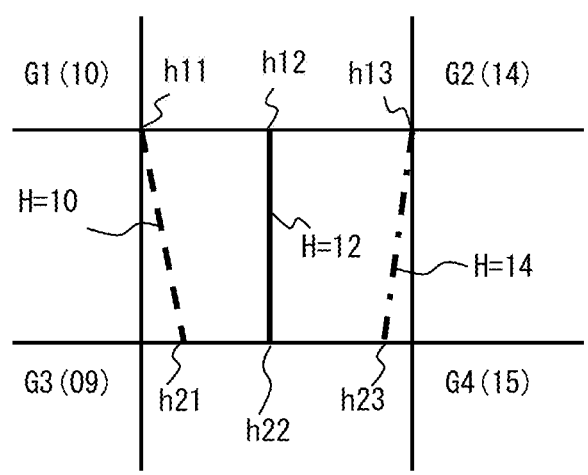
FIG. 36 is a diagram illustrating the isoline calculation method according to the sixth exemplary embodiment.

Next, the isoline calculation unit 16 acquires variations in signal strength at four corners (lattice points) of the grid (S401). For example, as shown in FIG. 36, variations in signal strength at the lattice points G1 to G4 are acquired. In FIG. 36, the variation in signal strength is 10 at the lattice point G1, 14 at the lattice point G2, 9 at the lattice point G3, and 15 at the lattice point G4.

Then, the isoline calculation unit 16 calculates a point with the value H of variation in signal strength on four sides of the grid by interpolation (S402). As shown in FIG. 36, by linear interpolation on the side connecting the lattice points G1 and G2, for example, a point h11 with H=10 is at a position of the lattice point G1, a point h12 with H=12 is at a midpoint of the lattice points G1 and G2, and a point h13 with H=14 is at a position of the lattice point G2. Further, by linear interpolation on the side connecting the lattice points G3 and G4, a point h21 with H=10 is at a position between the lattice point G3 and the midpoint of the lattice points G1 and G2, a point h22 with H=12 is at a midpoint of the lattice points G3 and G4, and a point h23 with H=14 is at a position between the lattice point G4 and the midpoint of the lattice points G3 and G4.

Then, the isoline calculation unit 16 connects the points with the value H of variation in signal strength calculated on each side by a straight line (S403). As shown in FIG. 36, the points h11, h12 and h13 on the side connecting the lattice points G1 and G2, and the points h21, h22 and h23 on the side connecting the lattice points G3 and G4 are respectively connected by a straight line.

After that, the isoline calculation unit 16 determines whether the above processing is done on the whole grid (S404), and repeats the processing after S401 on the whole grid to thereby obtain the isoline.

After calculating the isoline in S310 of FIG. 31, the display unit 15 displays the calculated isoline (S311). The display unit 15 displays the isoline as shown in FIG. 34(c).

Then, the physical characteristics detection unit 14 recognizes (detects) the shape of the object 2 based on the calculated and displayed isoline (S301). The physical characteristics detection unit 14 recognizes the outline indicated by the isoline displayed as shown in FIG. 34(c) as the shape of the object 2. Thus, in this exemplary embodiment, the physical characteristics detection unit 14 detects the shape of the object 2 according to the isoline calculated based on variations in signal strength of the RFID tags 5. Note that the shape of the object 2 may be detected using to the calculated isoline without display on the display unit 15.

As described above, in this exemplary embodiment, the shape of the object is detected by calculating an isoline based on variations in signal strength of a plurality of RFID tags. Because the isoline is calculated by interpolating the variations in signal strength, it is possible to detect the shape of the object more accurately. Further, a height, dielectric constant distribution and the like, not limited to the shape of the object, can be detected at the same time.

It should be noted that the present invention is not limited to the above-described exemplary embodiment and may be varied in many ways within the scope of the present invention.

The whole or part of the embodiments disclosed above can be described as, but not limited to, the following supplementary notes.

(Supplementary Note 1)

An object detection method for detecting an object using a fact that communication between an RFID tag and a reader antenna is blocked by an object existing near the RFID tag, the method including estimating one of a position, a thickness and a material of the object, a shape and an outline of the object from strength of a reflected radio signal from one or a plurality of RFID tags.

(Supplementary Note 2)

The object detection method according to Supplementary note 1, wherein a circulation is estimated based on the estimated position of the object.

(Supplementary Note 3) An object detection system used in the object detection method according to Supplementary note 1, wherein an open transmission line is used for the reader antenna.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2013-144627, filed on Jul. 10, 2013, the disclosure of which is incorporated herein in its entirety by reference.

REFERENCE SIGNS LIST

1 DETECTION MANAGEMENT DEVICE
2 OBJECT

3 COMMUNICATION NETWORK
3A HIGH-FREQUENCY CABLE (LAN CABLE)
4 READER WAVEGUIDE
5 RFID TAG
6 RFID READER
11 DETECTION INFORMATION DATABASE
11A CHARACTERISTIC PARAMETER INFORMATION
11B VERTICAL PARAMETER INFORMATION
11C HORIZONTAL PARAMETER INFORMATION
12 INPUT UNIT
13 SETTING UNIT
14 PHYSICAL CHARACTERISTICS DETECTION UNIT
15 DISPLAY UNIT
16 ISOLINE CALCULATION UNIT
41 GROUND PLANE
42 SPACER
43 STRIP CONDUCTOR
45 PARALLEL LINES
46 DISTRIBUTOR
101 READER WAVEGUIDE
102 RFID TAG
103 SIGNAL STRENGTH ACQUISITION UNIT
104 OBJECT DETECTION UNIT
105 OBJECT
201 RFID CHIP
202 TAG ANTENNA

The invention claimed is:

1. An object detection system comprising:
a reader waveguide formed as an open transmission line;
an RFID tag placed above the reader waveguide, the RFID tag being placed in such a manner that a positional relationship between the RFID tag and the reader waveguide is predetermined regardless of a presence or an absence of an object;
a signal strength acquisition unit that acquires signal strength of a read signal read from the RFID tag by electromagnetic coupling through the reader waveguide; and
an object detection unit that detects physical characteristics of the object corresponding to the acquired signal strength based on a relationship between three or more values of signal strength of the read signal and physical characteristics of the object to be detected.

2. The object detection system according to claim 1, wherein the physical characteristics include any one of a position, a size, a material and a shape of the object.

3. The object detection system according to claim 1, wherein the object detection unit detects the physical characteristics of the object based on a variation in signal strength of the read signal.

4. The object detection system according to claim 1, wherein the object detection unit detects the physical characteristics of the object corresponding to the acquired signal strength based on a relational expression representing a relationship between the signal strength of the read signal and the physical characteristics of the object.

5. The object detection system according to claim 4, wherein
the relational expression includes a plurality of parameters related to the physical characteristics of the object, and
the object detection unit detects the physical characteristics of the object by using the relational expression where a parameter of the plurality of parameters is set as a condition for detection.

6. The object detection system according to claim 5, wherein the plurality of parameters include a characteristic parameter indicating the physical characteristics of the object and a position parameter indicating a position of the object.

7. The object detection system according to claim 6, wherein the characteristic parameter includes any one of a size, a material and a shape of the object.

8. The object detection system according to claim 6, wherein the position parameter includes a position of the object in a horizontal direction relative to the RFID tag and a position of the object in a vertical direction relative to the RFID tag.

9. The object detection system according to claim 1, wherein
a plurality of RFID tags are placed above the reader waveguide, and
the object detection unit detects the physical characteristics of the object based on signal strength of the read signal read from a first RFID tag and a second RFID tag among the plurality of RFID tags.

10. The object detection system according to claim 9, wherein the object detection unit calculates one of an average value and a weighted average value of the physical characteristics of the object detected based on signal strength of the read signal read from the first RFID tag and the physical characteristics of the object detected based on signal strength of the read signal read from the second RFID tag.

11. The object detection system according to claim 9, wherein, when the first RFID tag and the second RFID tag are placed adjacent to each other, and signal strength of the read signal read from the first RFID tag and signal strength of the read signal read from the second RFID tag satisfy a specified condition, the object detection unit detects the physical characteristics of the object in an area between the first RFID tag and the second RFID tag.

12. The object detection system according to claim 9, wherein, when the first RFID tag is placed between a third RFID tag and the second RFID tag among the plurality of RFID tags, and signal strength of the read signal read from the first RFID tag satisfies a specified condition, the object detection unit detects the physical characteristics of the object in one of an area between the first RFID tag and the second RFID tag and an area between the first RFID tag and the third RFID tag.

13. The object detection system according to claim 12, wherein the object detection unit detects the physical characteristics of the object in an area between the first RFID tag and one of the second RFID tag and the third RFID tag with higher signal strength of the read signal.

14. The object detection system according to claim 9, wherein, when the first RFID tag is placed at an end of a line of the plurality of RFID tags, the first RFID tag and the second RFID tag are placed adjacent to each other, and signal strength of the read signal read from the first RFID tag satisfies a specified condition, the object detection unit detects the physical characteristics of the object in one of an area between the first RFID tag and the second RFID tag and an area on a side where the second RFID tag is not placed.

15. The object detection system according to claim 1, wherein
a plurality of RFID tags are placed above the reader waveguide, and
the object detection unit makes a determination about an overlap state where the object overlaps on the plurality of RFID tags according to signal strength of the read signal, and detects a shape of the object based on the overlap state.

16. The object detection system according to claim 1, wherein
a plurality of RFID tags are placed above the reader waveguide,
the object detection system further includes an isoline calculation unit that calculates an isoline based on signal strength of the read signal read from the plurality of RFID tags, and
the object detection unit detects a shape of the object based on the calculated isoline.

17. An object detection method comprising:
acquiring signal strength of a read signal read from an RFID tag placed above a reader waveguide formed as an open transmission line by electromagnetic coupling through the reader waveguide, the RFID tag being placed in such a manner that a positional relationship between the RFID tag and the reader waveguide is predetermined regardless of a presence or an absence of an object; and
detecting physical characteristics of the object corresponding to the acquired signal strength based on a relationship between three or more values of signal strength of the read signal and physical characteristics of the object to be detected.

18. A non-transitory computer-readable medium storing an object detection program causing a computer to execute an object detection process, the object detection process comprising:
acquiring signal strength of a read signal read from an RFID tag placed above a reader waveguide formed as an open transmission line by electromagnetic coupling through the reader waveguide, the RFID tag being placed in such a manner that a positional relationship between the RFID tag and the reader waveguide is predetermined regardless of a presence or an absence of an object; and
detecting physical characteristics of the object corresponding to the acquired signal strength based on a relationship between three or more values of signal strength of the read signal and physical characteristics of the object to be detected.

19. An object detection system comprising:
a reader waveguide formed as an open transmission line;
an RFID tag placed above the reader waveguide, the RFID tag being placed in such a manner that a positional relationship between the RFID tag and the reader waveguide is predetermined regardless of a presence or an absence of an object;
a signal strength acquisition means for acquiring signal strength of a read signal read from the RFID tag by electromagnetic coupling through the reader waveguide; and
an object detection means for detecting physical characteristics of the object corresponding to the acquired signal strength based on a relationship between three or more values of signal strength of the read signal and physical characteristics of the object to be detected.

* * * * *